United States Patent
Aratani et al.

[11] Patent Number: 6,014,121
[45] Date of Patent: Jan. 11, 2000

[54] DISPLAY PANEL AND APPARATUS CAPABLE OF RESOLUTION CONVERSION

[75] Inventors: Shuntaro Aratani, Kawasaki; Hiroshi Inoue, Yokohama; Masamichi Ohshima, Tokyo, all of Japan

[73] Assignee: Canon Kabushiki Kaisha, Tokyo, Japan

[21] Appl. No.: 08/773,646

[22] Filed: Dec. 24, 1996

[30] Foreign Application Priority Data

Dec. 28, 1995 [JP] Japan ................................. 7-343106

[51] Int. Cl.⁷ ........................................ G09G 3/36
[52] U.S. Cl. ................................. 345/89; 345/87
[58] Field of Search ............... 345/87, 88, 89, 345/98, 99, 100, 94, 96, 208, 210, 147, 148, 149, 103, 67

[56] References Cited

U.S. PATENT DOCUMENTS

| | | | |
|---|---|---|---|
| 4,655,561 | 4/1987 | Kanbe et al. | 350/350 S |
| 4,791,417 | 12/1988 | Bobak | 340/784 |
| 4,902,103 | 2/1990 | Miyake et al. | 350/336 |
| 5,091,723 | 2/1992 | Kanno et al. | 340/784 |
| 5,124,695 | 6/1992 | Green | 340/784 |
| 5,189,536 | 2/1993 | Hanyu et al. | 359/56 |
| 5,404,236 | 4/1995 | Hartmann et al. | 359/54 |
| 5,805,136 | 9/1998 | Silverbrook et al. | 345/89 |
| 5,808,594 | 9/1998 | Tsuboyama et al. | 345/89 |

FOREIGN PATENT DOCUMENTS

| | | |
|---|---|---|
| 0 349 426 | 1/1990 | European Pat. Off. . |
| 0361981 | 4/1990 | European Pat. Off. . |
| 0526135 | 2/1993 | European Pat. Off. . |
| 0 540 294 | 5/1993 | European Pat. Off. . |
| 0 597 793 | 5/1994 | European Pat. Off. . |
| 0 662 773 | 7/1995 | European Pat. Off. . |
| 0 673 011 | 9/1995 | European Pat. Off. . |
| 0 674 207 | 9/1995 | European Pat. Off. . |
| 0671648 | 9/1995 | European Pat. Off. . |
| 0671649 | 9/1995 | European Pat. Off. . |
| 0673012 | 9/1995 | European Pat. Off. . |
| 6-295338 | 10/1994 | Japan . |

*Primary Examiner*—Chanh Nguyen
*Attorney, Agent, or Firm*—Fitzpatrick, Cella, Harper & Scinto

[57] ABSTRACT

A display panel has a display picture area composed of a plurality of dots. The dots can be divided into a number m of first pixels having an effective area S1 and can also be divided into a number n of second pixels having an effective area S2, satisfying $S1<S2$, $m>n$ and $m/n \neq 2a$, wherein a is a natural number. As a result, the display panel can display a picture at different resolution levels without causing image quality deterioration.

43 Claims, 38 Drawing Sheets

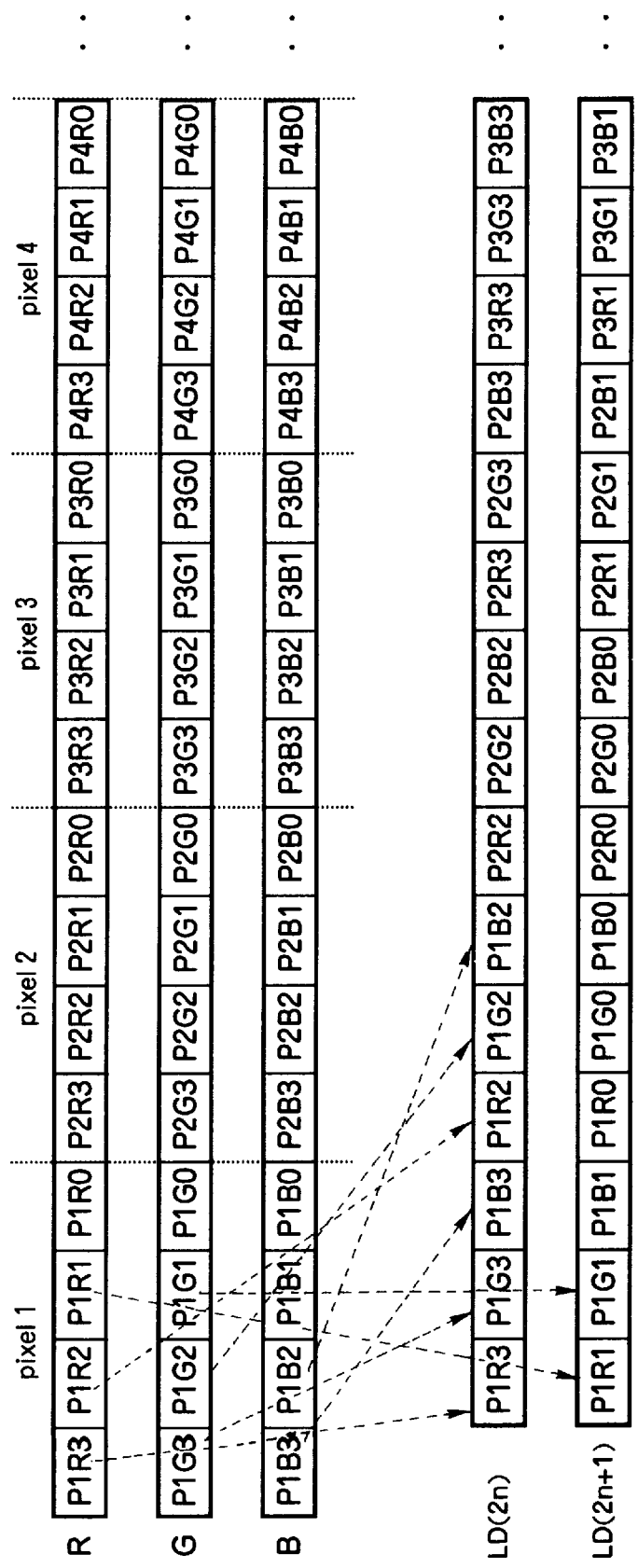

IMODE=2

|   | pixel1 | pixel2 | pixel3 | Pixel4 |     |     |     |     |
|---|--------|--------|--------|--------|-----|-----|-----|-----|
| R | P1R    | P2R    | P3R    | P4R    | P5R | P6R | P7R | ·· |
| G | P1G    | P2G    | P3G    | P4G    | P5G | P6G | P7G | ·· |
| B | P1B    | P2B    | P3B    | P4B    | P5B | P6B | P7B | ·· |

| LD(n) | P1Ra | P1Ga | P1Ba | P1Rb | P1Gb | P1Bb | P1Rb | P1Gb | P1Bb | P2Ra | P2Ga | P2Ba | P2Rb | P2Gb |
|-------|------|------|------|------|------|------|------|------|------|------|------|------|------|------|

| Line0 | Line1 | Line2 | Line3 | Line4 | Line5 | Line6 | Line7 | Line8 | Line9 | . . | Line763 | Line764 | Line765 | Line766 | Line767 |

| 1 | 0 | 0 | 1 | 0 | 0 | 1 | 0 | 0 | 0 | | 0 | 0 | 1 | 0 | 0 |

FIG. 12

| INPUT | OUTPUT a | OUTPUT b |
|---|---|---|
| 0 | 0 | 0 |
| 1 | 0 | 0 |
| 2 | 0 | 0 |
| 3 | 0 | 0 |
| 4 | 0 | 0 |
| 5 | 0 | 1 |
| 6 | 0 | 1 |
| 7 | 0 | 1 |
| 8 | 0 | 1 |
| 9 | 0 | 1 |
| 10 | 1 | 1 |
| 11 | 1 | 1 |
| 12 | 1 | 1 |
| 13 | 1 | 1 |
| 14 | 1 | 1 |
| 15 | 1 | 1 |

SMODE=0

| ADDRESS | S0 | S1 | S2 | S3 | S4 | S5 | S6 | S7 | S8 | S9 | S10 | S11 | . . . | S2300 | S2301 | S2302 | S2303 |
|---|---|---|---|---|---|---|---|---|---|---|---|---|---|---|---|---|---|
| 0 | 1 | 0 | 0 | 0 | 0 | 0 | 0 | 0 | 0 | 0 | 0 | 0 | . . . | 0 | 0 | 0 | 0 |
| 1 | 0 | 1 | 0 | 0 | 0 | 0 | 0 | 0 | 0 | 0 | 0 | 0 | . . . | 0 | 0 | 0 | 0 |
| 2 | 0 | 0 | 1 | 0 | 0 | 0 | 0 | 0 | 0 | 0 | 0 | 0 | . . . | 0 | 0 | 0 | 0 |
| 3 | 0 | 0 | 0 | 1 | 0 | 0 | 0 | 0 | 0 | 0 | 0 | 0 | . . . | 0 | 0 | 0 | 0 |
| 4 | 0 | 0 | 0 | 0 | 1 | 0 | 0 | 0 | 0 | 0 | 0 | 0 | . . . | 0 | 0 | 0 | 0 |
| 5 | 0 | 0 | 0 | 0 | 0 | 1 | 1 | 1 | 1 | 0 | 0 | 0 | . . . | 0 | 0 | 0 | 0 |
| 6 | 0 | 0 | 0 | 0 | 0 | 0 | 0 | 0 | 0 | 1 | 1 | 0 | . . . | 0 | 0 | 0 | 0 |
| 7 | 0 | 0 | 0 | 0 | 0 | 0 | 0 | 0 | 0 | 1 | 0 | 0 | . . . | 0 | 0 | 0 | 0 |
| 8 | 0 | 0 | 0 | 0 | 0 | 0 | 0 | 0 | 0 | 0 | 0 | 0 | . . . | 0 | 0 | 0 | 0 |
| . . . | | | | | | | | | | | | | | | | | |
| 1533 | 0 | 0 | 0 | 0 | 0 | 0 | 0 | 0 | 0 | 0 | 0 | 0 | . . . | 1 | 0 | 0 | 0 |
| 1534 | 0 | 0 | 0 | 0 | 0 | 0 | 0 | 0 | 0 | 0 | 0 | 0 | . . . | 0 | 1 | 0 | 1 |
| 1535 | 0 | 0 | 0 | 0 | 0 | 0 | 0 | 0 | 0 | 0 | 0 | 0 | . . . | 0 | 0 | 1 | 0 |

FIG. 20A

SMODE=1

| ADDRESS | S0 | S1 | S2 | S3 | S4 | S5 | S6 | S7 | S8 | S9 | S10 | S11 | ... | S2300 | S2301 | S2302 | S2303 |
|---|---|---|---|---|---|---|---|---|---|---|---|---|---|---|---|---|---|
| 0 | 1 | 1 | 0 | 1 | 0 | 0 | 0 | 0 | 0 | 0 | 0 | 0 | . | 0 | 0 | 0 | 0 |
| 1 | 0 | 0 | 0 | 0 | 1 | 1 | 1 | 1 | 0 | 0 | 0 | 0 | . | 0 | 0 | 0 | 0 |
| 2 | 0 | 0 | 0 | 0 | 0 | 0 | 0 | 0 | 1 | 1 | 1 | 1 | . | 0 | 0 | 0 | 0 |
| 3 | 0 | 0 | 0 | 0 | 0 | 0 | 0 | 1 | 0 | 0 | 0 | 0 | . | 0 | 0 | 0 | 0 |
| 4 | 0 | 0 | 0 | 0 | 0 | 0 | 0 | 0 | 0 | 0 | 0 | 0 | . | 0 | 0 | 0 | 0 |
| 5 | 0 | 0 | 0 | 0 | 0 | 0 | 0 | 0 | 0 | 0 | 0 | 0 | . | 0 | 0 | 0 | 0 |
| 6 | 0 | 0 | 0 | 0 | 0 | 0 | 0 | 0 | 0 | 0 | 0 | 0 | . | 0 | 0 | 0 | 0 |
| 7 | 0 | 0 | 0 | 0 | 0 | 0 | 0 | 0 | 0 | 0 | 0 | 0 | . | 0 | 0 | 0 | 0 |
| 8 | 0 | 0 | 0 | 0 | 0 | 0 | 0 | 0 | 0 | 0 | 0 | 0 | . | 0 | 0 | 0 | 0 |
| ... | | | | | | | | | | | | | | | | | |
| 573 | 0 | 0 | 0 | 0 | 0 | 0 | 0 | 0 | 0 | 0 | 0 | 0 | . | 0 | 0 | 0 | 0 |
| 574 | 0 | 0 | 0 | 0 | 0 | 0 | 0 | 0 | 0 | 0 | 0 | 0 | . | 0 | 0 | 0 | 0 |
| 575 | 0 | 0 | 0 | 0 | 0 | 0 | 0 | 0 | 0 | 0 | 0 | 0 | . | 1 | 1 | 1 | 1 |

FIG. 20B

SMODE=2

| ADDRESS | S0 | S1 | S2 | S3 | S4 | S5 | S6 | S7 | S8 | S9 | S10 | S11 | ... | S2300 | S2301 | S2302 | S2303 |
|---|---|---|---|---|---|---|---|---|---|---|---|---|---|---|---|---|---|
| 0 | 1 | 0 | 0 | 0 | 0 | 0 | 0 | 0 | 0 | 0 | 0 | 0 | . . . | 0 | 0 | 0 | 0 |
| 1 | 0 | 1 | 0 | 0 | 0 | 0 | 0 | 0 | 0 | 0 | 0 | 0 | . . . | 0 | 0 | 0 | 0 |
| 2 | 0 | 0 | 1 | 1 | 0 | 0 | 0 | 0 | 0 | 0 | 0 | 0 | . . . | 0 | 0 | 0 | 0 |
| 3 | 0 | 0 | 0 | 0 | 1 | 0 | 0 | 0 | 0 | 0 | 0 | 0 | . . . | 0 | 0 | 0 | 0 |
| 4 | 0 | 0 | 0 | 0 | 0 | 0 | 1 | 1 | 1 | 0 | 0 | 0 | . . . | 0 | 0 | 0 | 0 |
| 5 | 0 | 0 | 0 | 0 | 0 | 1 | 0 | 0 | 0 | 1 | 1 | 1 | . . . | 0 | 0 | 0 | 0 |
| 6 | 0 | 0 | 0 | 0 | 0 | 0 | 0 | 0 | 0 | 0 | 0 | 0 | . . . | 0 | 0 | 0 | 0 |
| 7 | 0 | 0 | 0 | 0 | 0 | 0 | 0 | 0 | 0 | 0 | 0 | 0 | . . . | 0 | 0 | 0 | 0 |
| 8 | 0 | 0 | 0 | 0 | 0 | 0 | 0 | 0 | 0 | 0 | 0 | 0 | . . . | 0 | 0 | 0 | 0 |
| . . . | | | | | | | | | | | | | | | | | |
| 1149 | 0 | 0 | 0 | 0 | 0 | 0 | 0 | 0 | 0 | 0 | 0 | 0 | . . . | 0 | 0 | 0 | 0 |
| 1150 | 0 | 0 | 0 | 0 | 0 | 0 | 0 | 0 | 0 | 0 | 0 | 0 | . . . | 1 | 1 | 0 | 0 |
| 1151 | 0 | 0 | 0 | 0 | 0 | 0 | 0 | 0 | 0 | 0 | 0 | 0 | . . . | 0 | 0 | 1 | 1 |

FIG. 21

FIG. 25A   B=0
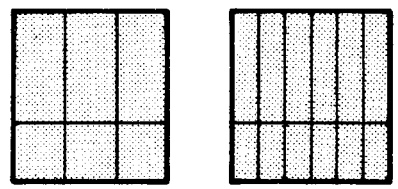
FIG. 25B   B=1
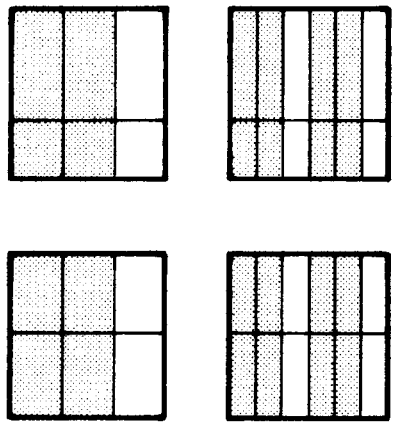

FIG. 27A  G=0 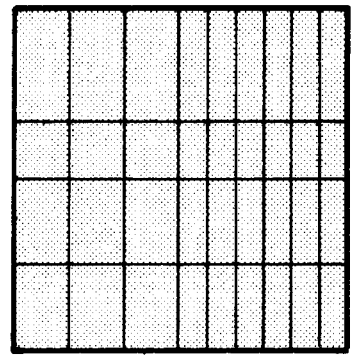
FIG. 27B  G=1 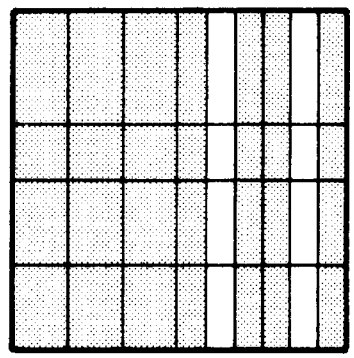
FIG. 27C  G=2 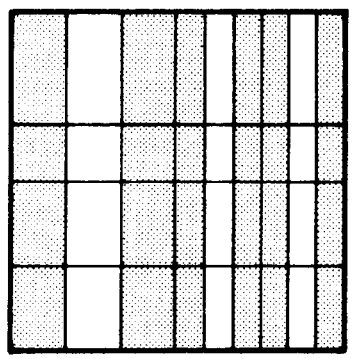

3:4:6

| 3.44 | 2.75 | 2.06 | 1.375 | 2.75 | 4.125 | 2.06 | 2.75 | 3.44 |
|------|------|------|-------|------|-------|------|------|------|
| 1.25 | 1 | 0.75 | 0.5 | 1 | 1.5 | 0.75 | 1 | 1.25 |
| 1.56 | 1.25 | 0.94 | 0.625 | 1.25 | 1.875 | 0.94 | 1.25 | 1.56 |
| 1.875 | 1.5 | 1.125 | 0.75 | 1.5 | 2.25 | 1.125 | 1.5 | 1.875 |
| 1.25 | 1 | 0.75 | 0.5 | 1 | 1.5 | 0.75 | 1 | 1.25 |
| 3.125 | 2.50 | 1.875 | 1.25 | 2.50 | 3.75 | 1.875 | 2.50 | 3.125 |
| 1.56 | 1.25 | 0.94 | 0.625 | 1.25 | 1.875 | 0.94 | 1.25 | 1.56 |
| 1.25 | 1 | 0.75 | 0.5 | 1 | 1.5 | 0.75 | 1 | 1.25 |
| 3.44 | 2.75 | 2.06 | 1.375 | 2.75 | 4.125 | 2.06 | 2.75 | 3.44 |

FIG. 31

3:4:6 STANDARD MODE
0/16

| 3.44 | 2.75 | 2.06 | 1.375 | 2.75 | 4.125 | 2.06 | 2.75 | 3.44 |
|------|------|------|-------|------|-------|------|------|------|
| 1.25 | | 0.75 | 0.5 | | 1.5 | 0.75 | | 1.25 |
| 1.56 | 1.25 | 0.94 | 0.625 | 1.25 | 1.875 | 0.94 | 1.25 | 1.56 |
| 1.875 | 1.5 | 1.125 | 0.75 | 1.5 | 2.25 | 1.125 | 1.5 | 1.875 |
| 1.25 | | 0.75 | 0.5 | | 1.5 | 0.75 | | 1.25 |
| 3.125 | 2.50 | 1.875 | 1.25 | 2.50 | 3.75 | 1.875 | 2.50 | 3.125 |
| 1.56 | 1.25 | 0.94 | 0.625 | 1.25 | 1.875 | 0.94 | 1.25 | 1.56 |
| 1.25 | | 0.75 | 0.5 | | 1.5 | 0.75 | | 1.25 |
| 3.44 | 2.75 | 2.06 | 1.375 | 2.75 | 4.125 | 2.06 | 2.75 | 3.44 |

| 3.44 | 2.75 | 2.06 | 1.375 | 2.75 | 4.125 | 2.06 | 2.75 | 3.44 |
|------|------|------|-------|------|-------|------|------|------|
| 1.25 | 1 | 0.75 | 0.5 | 1 | 1.5 | 0.75 | 1 | 1.25 |
| 1.56 | 1.25 | 0.94 | 0.625 | 1.25 | 1.875 | 0.94 | 1.25 | 1.56 |
| 1.875 | 1.5 | 1.125 | 0.75 | 1.5 | 2.25 | 1.125 | 1.5 | 1.875 |
| 1.25 | 1 | 0.75 | 0.5 | 1 | 1.5 | 0.75 | 1 | 1.25 |
| 3.125 | 2.50 | 1.875 | 1.25 | 2.50 | 3.75 | 1.875 | 2.50 | 3.125 |
| 1.56 | 1.25 | 0.94 | 0.625 | 1.25 | 1.875 | 0.94 | 1.25 | 1.56 |
| 1.25 | 1 | 0.75 | 0.5 | 1 | 1.5 | 0.75 | 1 | 1.25 |
| 3.44 | 2.75 | 2.06 | 1.375 | 2.75 | 4.125 | 2.06 | 2.75 | 3.44 |

| 3.44 | 2.75 | 2.06 | 1.375 | 2.75 | 4.125 | 2.06 | 2.75 | 3.44 |
|------|------|------|-------|------|-------|------|------|------|
| 1.25 | | 0.75 | 0.5 | | 1.5 | 0.75 | | 1.25 |
| 1.56 | 1.25 | 0.94 | 0.625 | 1.25 | 1.875 | 0.94 | 1.25 | 1.56 |
| 1.875 | 1.5 | 1.125 | 0.75 | 1.5 | 2.25 | 1.125 | 1.5 | 1.875 |
| 1.25 | | 0.75 | 0.5 | | 1.5 | 0.75 | | 1.25 |
| 3.125 | 2.50 | 1.875 | 1.25 | 2.50 | 3.75 | 1.875 | 2.50 | 3.125 |
| 1.56 | 1.25 | 0.94 | 0.625 | 1.25 | 1.875 | 0.94 | 1.25 | 1.56 |
| 1.25 | | 0.75 | 0.5 | | 1.5 | 0.75 | | 1.25 |
| 3.44 | 2.75 | 2.06 | 1.375 | 2.75 | 4.125 | 2.06 | 2.75 | 3.44 |

| 3.44 | 2.75 | 2.06 | 1.375 | 2.75 | 4.125 | 2.06 | 2.75 | 3.44 |
|------|------|------|-------|------|-------|------|------|------|
| 1.25 | 1 | 0.75 | 0.5 | 1 | 1.5 | 0.75 | 1 | 1.25 |
| 1.56 | 1.25 | 0.94 | 0.625 | 1.25 | 1.875 | 0.94 | 1.25 | 1.56 |
| 1.875 | 1.5 | 1.125 | 0.75 | 1.5 | 2.25 | 1.125 | 1.5 | 1.875 |
| 1.25 | 1 | 0.75 | 0.5 | 1 | 1.5 | 0.75 | 1 | 1.25 |
| 3.125 | 2.50 | 1.875 | 1.25 | 2.50 | 3.75 | 1.875 | 2.50 | 3.125 |
| 1.56 | 1.25 | 0.94 | 0.625 | 1.25 | 1.875 | 0.94 | 1.25 | 1.56 |
| 1.25 | 1 | 0.75 | 0.5 | 1 | 1.5 | 0.75 | 1 | 1.25 |
| 3.44 | 2.75 | 2.06 | 1.375 | 2.75 | 4.125 | 2.06 | 2.75 | 3.44 |

FIG. 35D

FIG. 36A — 3:4:6 LOW-RESOUTION MODE, 0/16

DISPLAY PANEL AND APPARATUS CAPABLE OF RESOLUTION CONVERSION

FIELD OF THE INVENTION AND RELATED ART

The present invention relates to a display panel used in a display for data processing systems, such as a computer, a word processor, a television receiver, and a car navigation system; a view finder for a video camera; a light valve for a projector, etc.; particularly a display panel capable of resolution conversion and display apparatus including such a display panel.

In case of displaying a picture or image of a lower resolution by using a dot matrix-type display panel having a fixed resolution, i.e., a fixed number of pixels, it has been practiced to display the lower resolution picture in a part of the display area of the display panel while leaving the remaining region as a non-display region.

On the other hand, in case of displaying an image of a resolution higher than a prescribed resolution of a display panel, it has been practiced to display a portion of the image to be display over the entire region of the display panel (virtual screen). In this case, it is impossible to simultaneously display an entire image on the display panel (First scheme).

There is also known a scheme (Second scheme) wherein four dots are used as one pixel to effect an enlarged display in the case of a low resolution display. For example, a display panel having a resolution of 1280×1024 may be used to effect a low-resolution display of 640×480 over an area almost identical to its original display area (screen). However according to this scheme, a display panel having a resolution of 1024×768 cannot be used to effect an enlarged display of a picture of 640×480 entirely.

In order to solve the above problems, we have proposed a scheme (Third scheme) wherein the image data is thinned out and then enlarged, thereby conforming the enlarged image size to that of the display panel size (JP-A 5-1197374, EP-A 0540294). However, a further improvement is required in order to prevent the blurring of a display image and remove a non-naturalness caused by the thinning-out of image data.

Further, JP-A 6-295338 has disclosed an image data processing scheme without including thinning-out of image data (Fourth scheme).

According to the above-mentioned First scheme, it is impossible to simultaneously display an entire image on a display panel.

Second scheme allows an enlarged display only in a ratio of $2^n$ (n: integer).

According to Third scheme, a portion of image data is lost due to the thinning-out.

Fourth scheme involves complicated data processing or operation, so that a complicated and large-scale image processing circuit is required to obstruct the provision of an inexpensive apparatus.

SUMMARY OF THE INVENTION

In view of the above-mentioned problems, an object of the present invention is to provide a display panel allowing easy picture data processing and providing an inexpensive display apparatus.

Another object of the present invention is to provide a display panel and a display apparatus capable of preventing blurring of display images and change in thickness of characters and lines.

Another object of the present invention is to provide a display panel and a display apparatus little liable to be affected by noise (jitter) of input signals.

As a result of a large number of experiments and trial and errors, we have traversed a conventional concept that a picture data processing circuit is in charge of resolution conversion for enlargement or reduction in a ratio other than $2^n$ (n: integer) and arrived at a concept that a display panel is in charge of the resolution conversion. Then, this concept has been reduced into practice by using a display panel having a unique dot (pixel) pattern.

According to the present invention, there is provided a display panel comprising a multiplicity of pixels each comprising a plurality of dots having mutually different areas and disposed in a prescribed arrangement; wherein the pixels can be equally divided into a number m of first pixels having an effective area S1 and can also be equally divided into a number n of second pixels having an effective area S2, satisfying S1<S2 and m/n≠2a, wherein a is a natural number.

According to the present invention, there is also provided a display panel comprising a multiplicity of pixels each comprising a plurality of dots having mutually different areas and disposed in a prescribed arrangement; wherein the pixels can be equally divided into a number p of first pixels having an effective area S1, can also be equally divided into a number q of second pixels having an effective area S2, and can further be divided into a number r of third pixels having an effective area S3, satisfying S1<S2<S3 and p/q 162a, and p/r=2a, wherein a is a natural number.

According to another aspect of the present invention, there is provided a display panel comprising a display area wherein a plurality of pixels are arranged repetitively and regularly, wherein the display area can be divided into a multiplicity of first pixels having an effective area S1, and the first pixels including pixels comprising a first combination of dots selected from the plurality of dots, and pixels comprising a second combination (different from the first combination) of pixels selected from the plurality of dots.

According to another aspect of the present invention, there is provided a display panel comprising a multiplicity of pixels each comprising at least two types of dots having mutually different areas, wherein the multiplicity of pixels can entirely be divided into a number m of first pixels having mutually equal areas, and the multiplicity of pixels, except for a partial region thereof, can also be divided into a number n of second pixels having mutually equal areas, satisfying m>n and m/n≠a (a: natural number).

According to another aspect of the present invention, there is provided a display panel having a pixel region comprising at least two types of dots having mutually different areas, wherein the pixel region can be equally divided into first pixels having an effective area S1 and can also be divided into second pixels having an effective area S2, satisfying:

$$S1 < S2 \text{ and } \sqrt{S2}/\sqrt{S1} \neq b \quad (b: \text{ natural number}).$$

According to another aspect of the present invention, there is provided a display panel having a display picture area comprising at least two types of dots having mutually different areas, wherein an entirety of the display picture area can be equally divided into first pixels having an effective area S1 and can also be divided into second pixels having an effective area S2, satisfying:

$$S1 < S2 \text{ and } \sqrt{S2}/\sqrt{S1} \neq b \quad (b: \text{ natural number}).$$

According to another aspect of the present invention, there is provided a display panel having a display picture area comprising at least two types of dots having mutually different areas, wherein an entirety of the display picture area can be equally divided into first pixels having an effective area S1 and, except for a partial region thereof, can also be divided into second pixels having an effective area S2, satisfying:

$$S1 < S2 \text{ and } \sqrt{S2}/\sqrt{S1} \neq b \quad (b: \text{ natural number}).$$

According to the present invention, a pixel functioning as a display unit or element can be formed as a combination of dots appropriately selected from the plurality of dots so as to obtain a desired resolution. As a result, the effective area of one pixel can be enlarged or reduced in a ratio other than $2^n$ (n: integer) to obtain a desired resolution. In this way, a display panel per se has a dot pattern allowing a resolution conversion, so that the picture data processing circuit need not effect a complicated operation for resolution conversion. Thus, a conventional resolution conversion by a digital-interpolation or a signal processing, such as over-sampling, becomes unnecessary, thus obviating blurring of a displayed picture, a change in thickness of characters and lines and adverse effect of noise (jitter).

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 10A, 10B and 11 respectively illustrate a manner of processing display data for resolution conversion in the First embodiment.

FIG. 12 shows a logic table used in the resolution conversion processing illustrated in FIG. 11.

FIG. 13 illustrates a relationship between a flag memory and scanning lines used in the First embodiment.

FIGS. 20A, 20B and 21 respectively show a logic table for illustrating a decoder operation depending on a display mode in First embodiment.

FIGS. 25A–25B and FIGS. 27A–27C illustrate manners of gradational display at the gradations shown in FIG. 24 and FIG. 26, respectively.

Figures 32A, 32B, 32C, 32D:
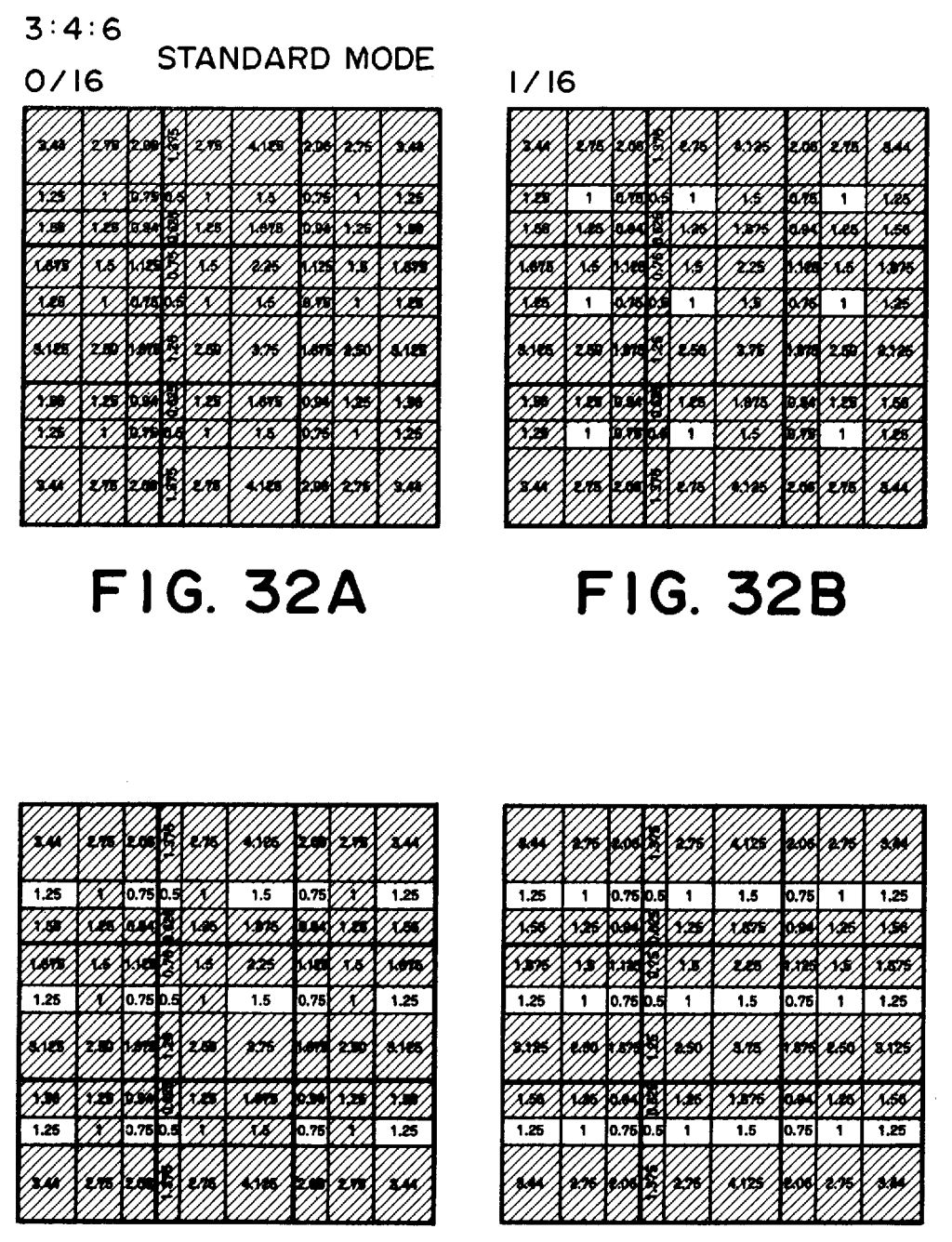
Figures 33A, 33B, 33C, 33D:
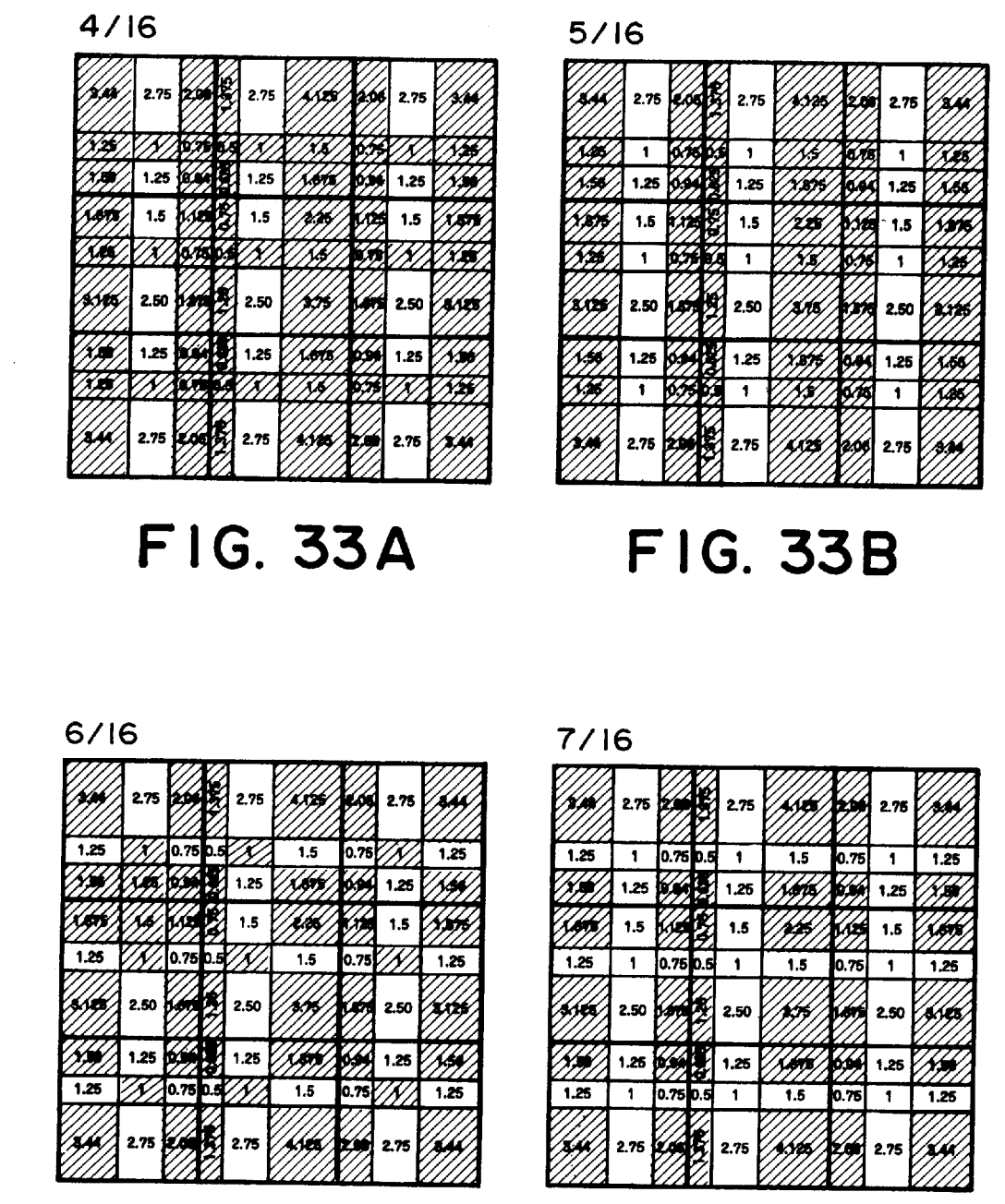
Figures 34A, 34B, 34C, 34D:
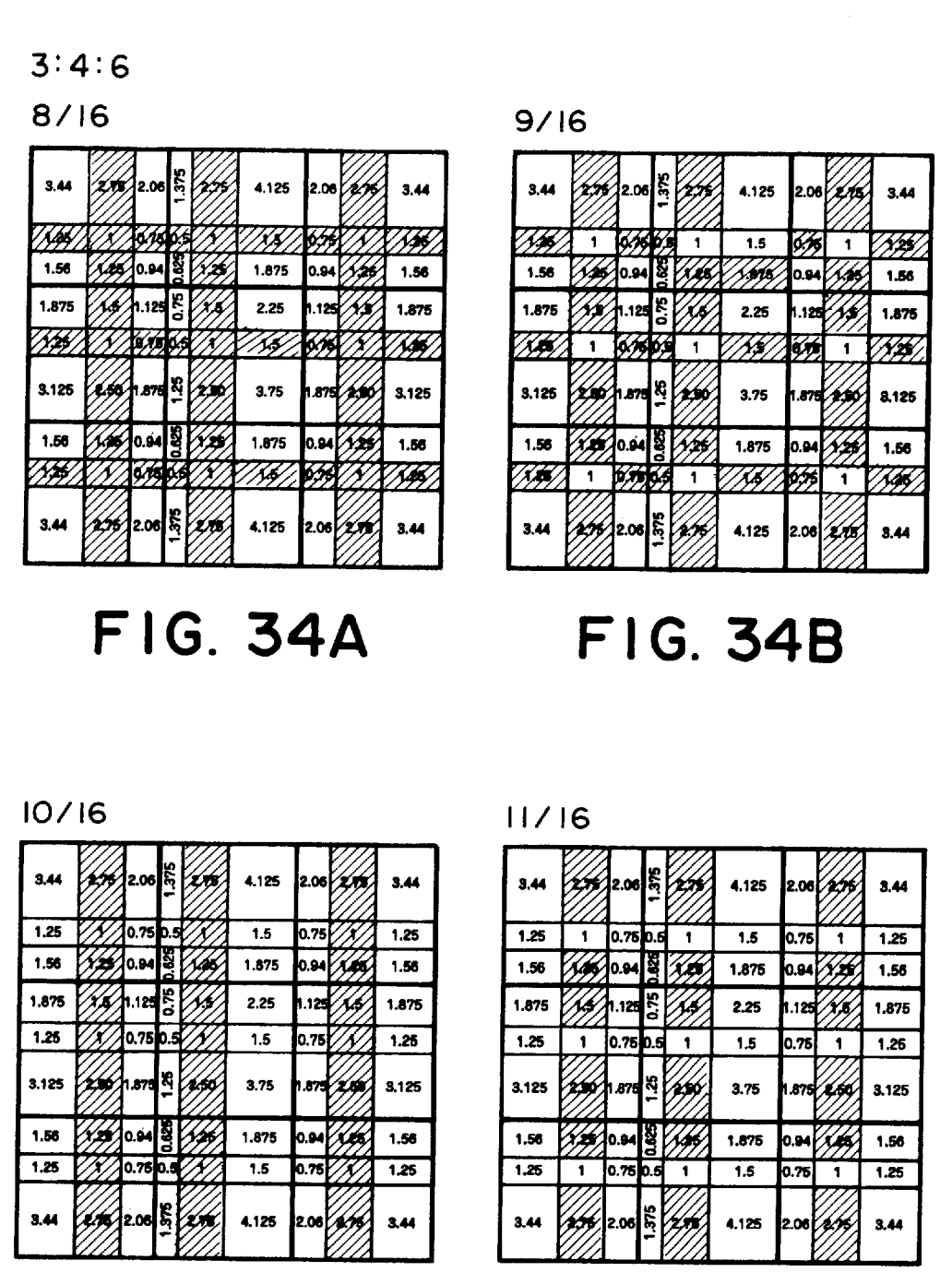

FIGS. 28–34 illustrate partial pixel arrangements of display panels according to Second to Fifth embodiments, respectively.

FIGS. 32A–32D, 33A–33D, 34A–34D, and 35A–35D, in combination, illustrate an example of gradational display (according to a standard mode) by using a display panel of the Fourth embodiment.

Figures 36A, 36B, 36C, 36D:
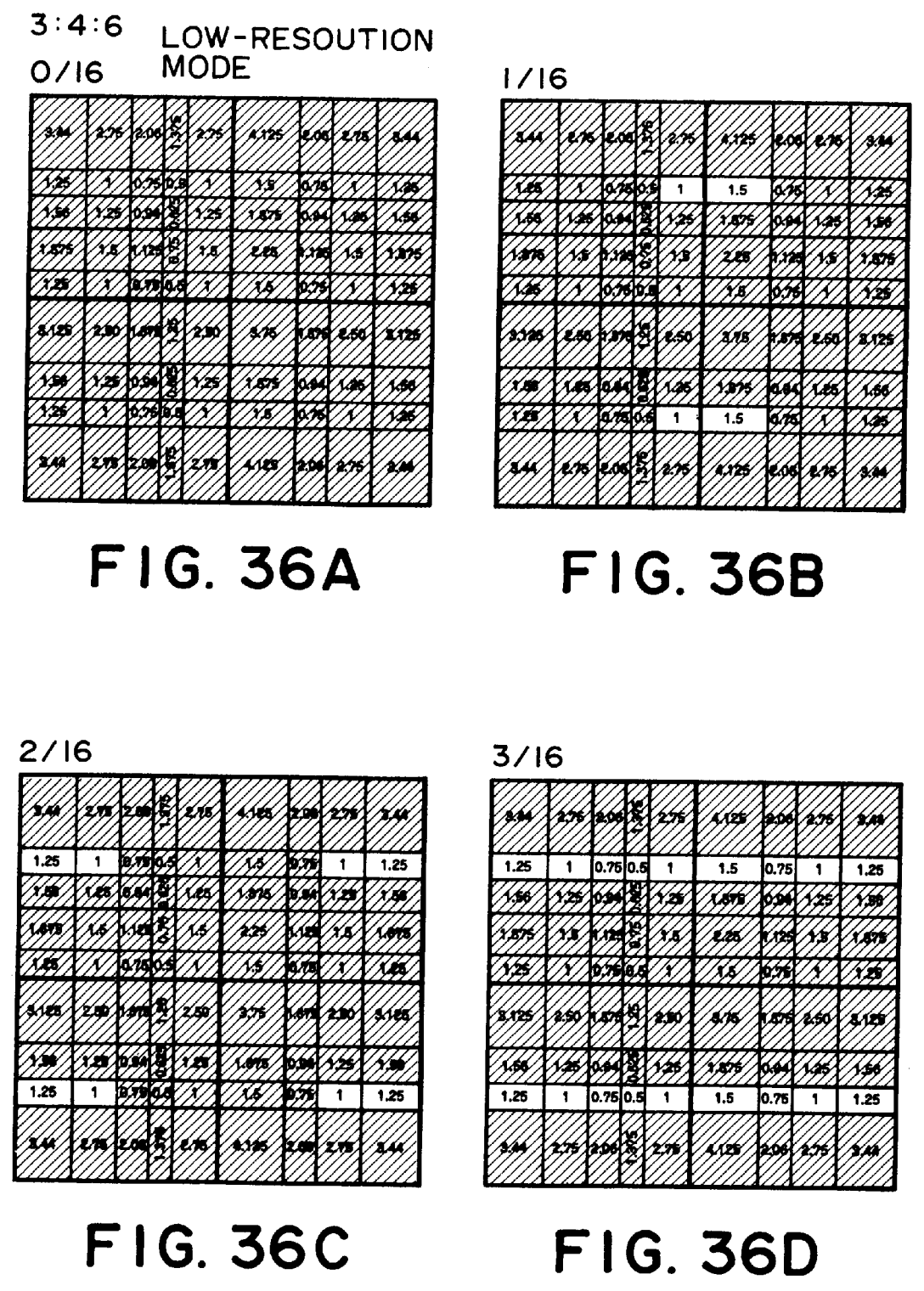
Figures 37A, 37B, 37C, 37D:
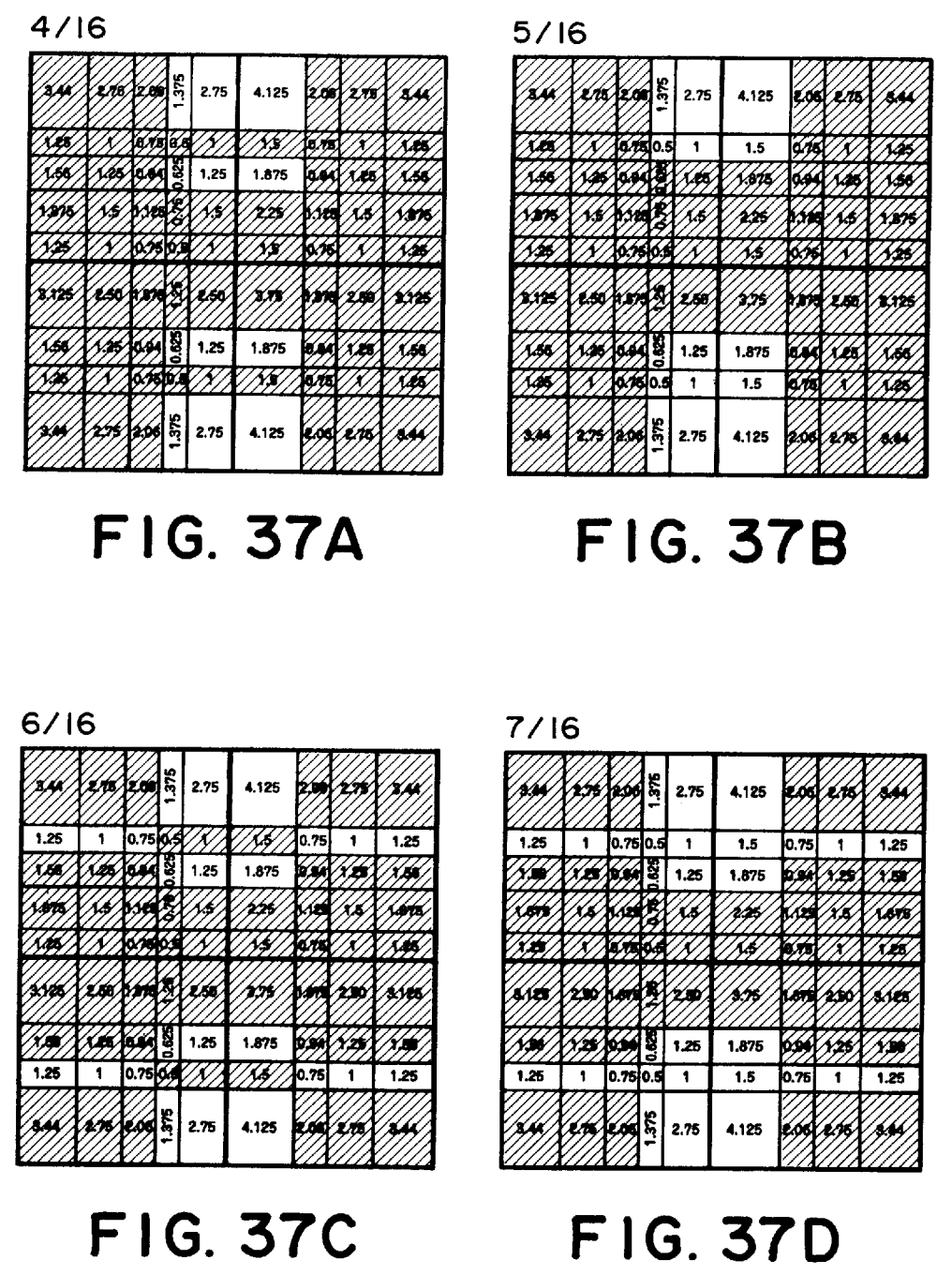
Figures 38A, 38B, 38C, 38D:
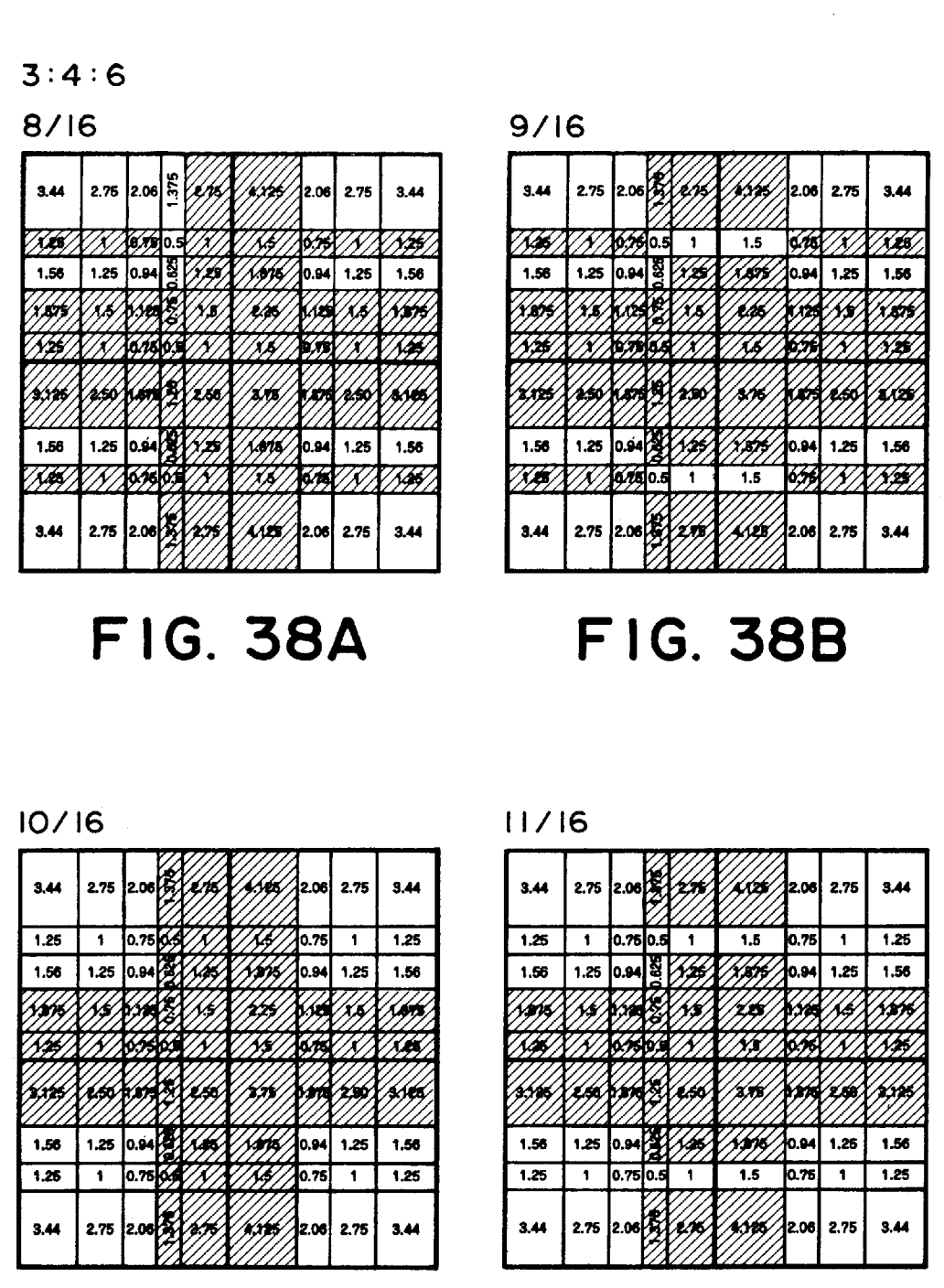
Figures 39A, 39B, 39C, 39D:
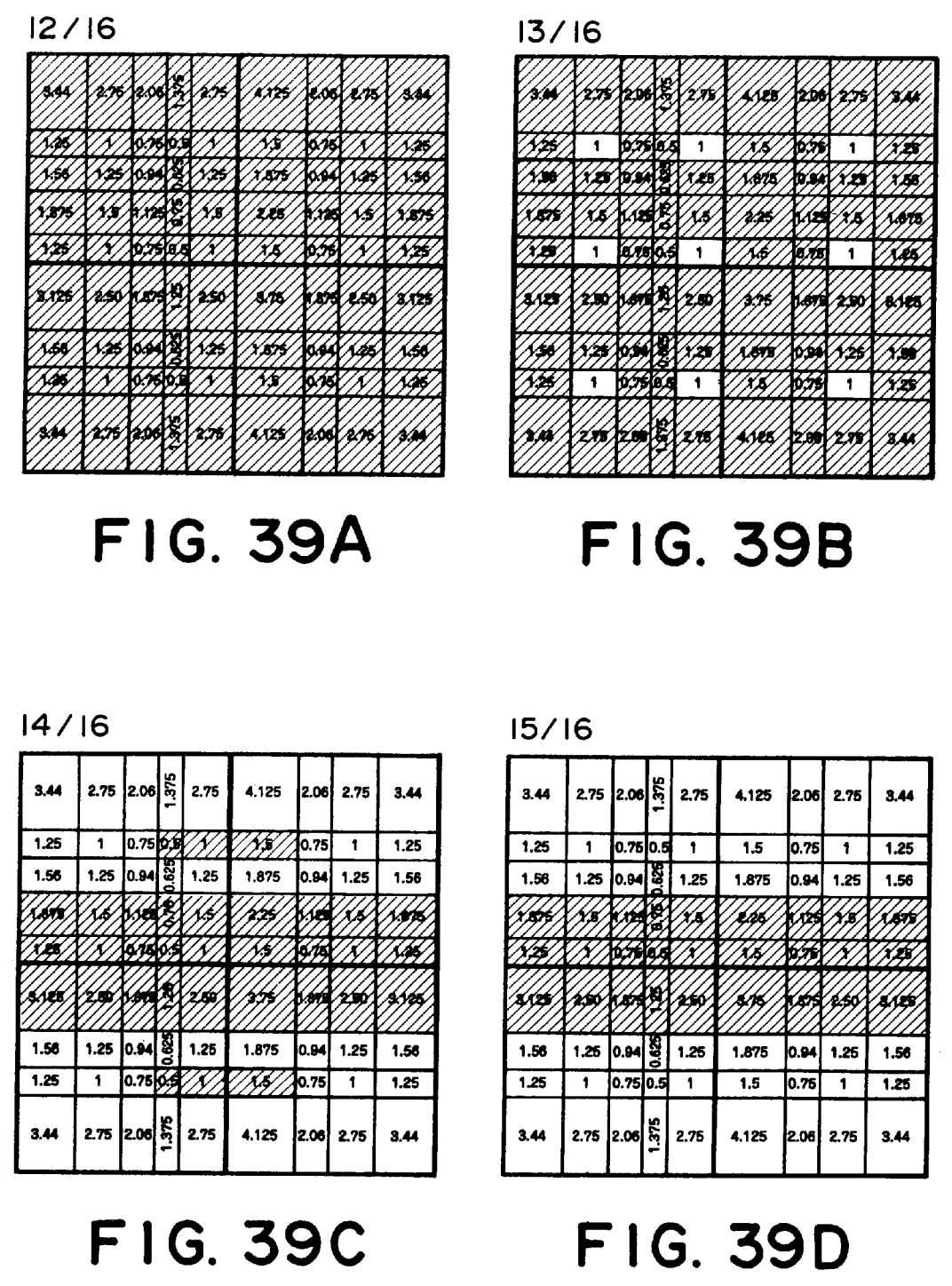

FIGS. 36A–36D, 37A–37D, 38A–38D, and 39A–39D, in combination, illustrate an example of gradational display (according to a low-resolution mode) by using the display panel of Fourth embodiment.

DESCRIPTION OF THE PREFERRED EMBODIMENTS

Figure 1:
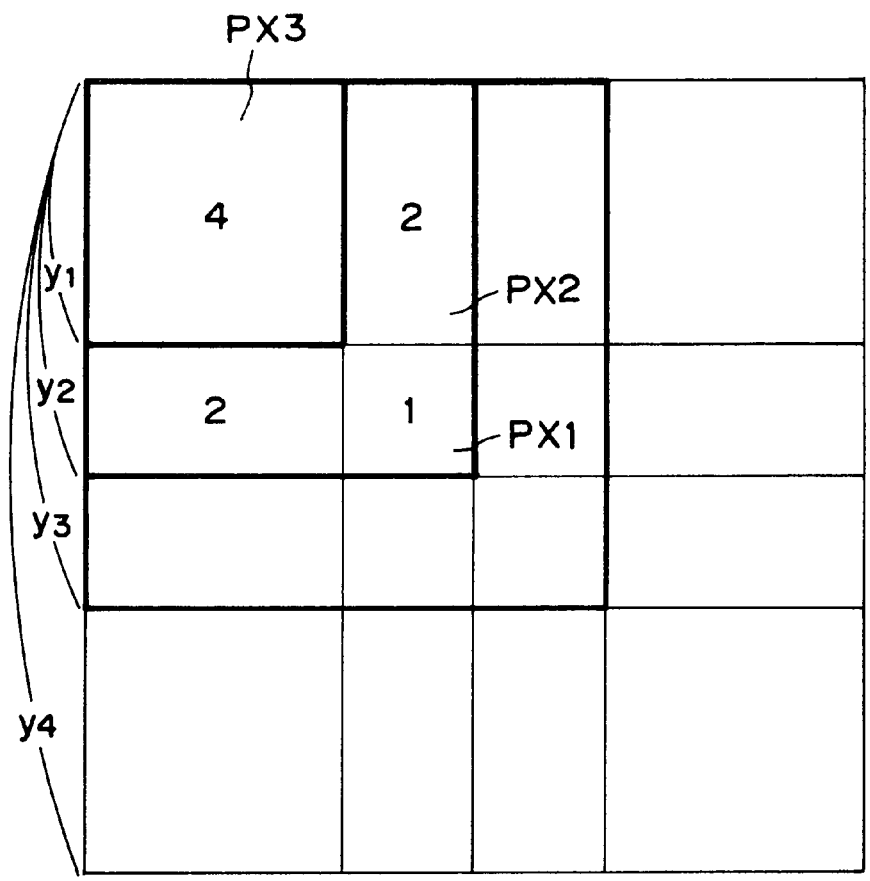
FIG. 1 illustrates a partial pixel arrangement in a display panel according to a preferred embodiment of the invention.

FIG. 1 illustrates a partial pixel arrangement in a display panel according to a preferred embodiment of the present invention.

[Dot pattern]

A display panel used in the present invention has a dot pattern (or pixel pattern) as described hereinbelow.

Minimum units of the dot pattern includes three types of dots, i.e., a dot (or sub-pixel) PX1 having the smallest area, a dot PX2 having a larger area, and a dot PX3 having the largest area. These dots independently denote a state of either "bright" or "dark" according to a certain regularity. For easier comprehension, the dots are assumed to have relative areas of 1:2:4 from the smallest to the largest.

By combining such dots in appropriate manners, pixels having prescribed effective areas are formed.

Figure 2A:
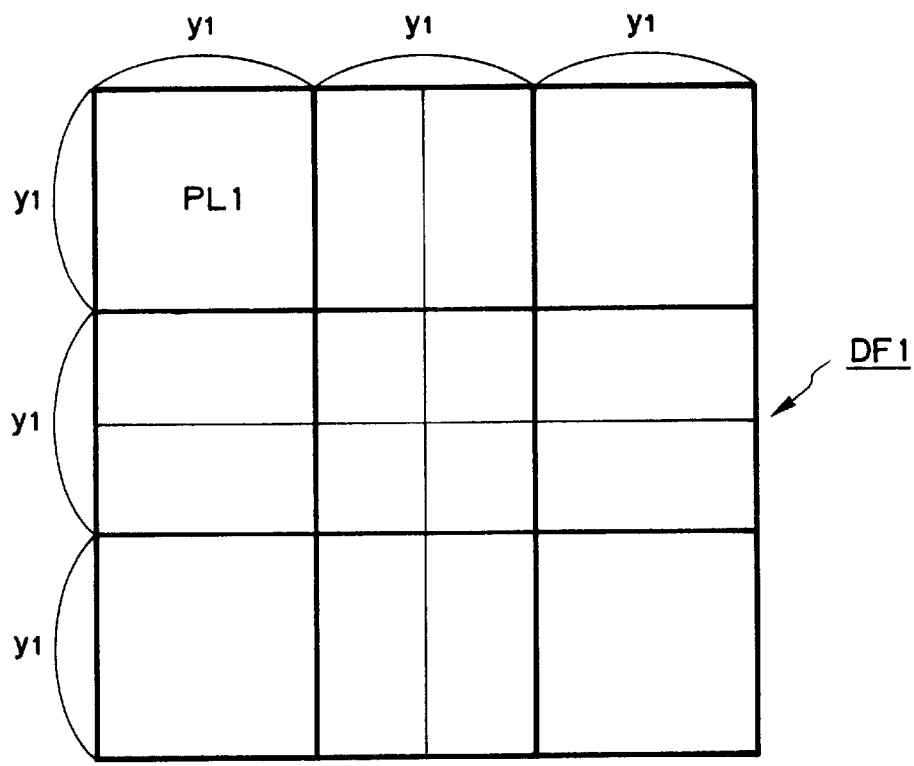
FIGS. 2A, 2B and 3 respectively illustrate a manner of pixel area conversion based on the pixel arrangement shown in FIG. 1.
Figure 2B:
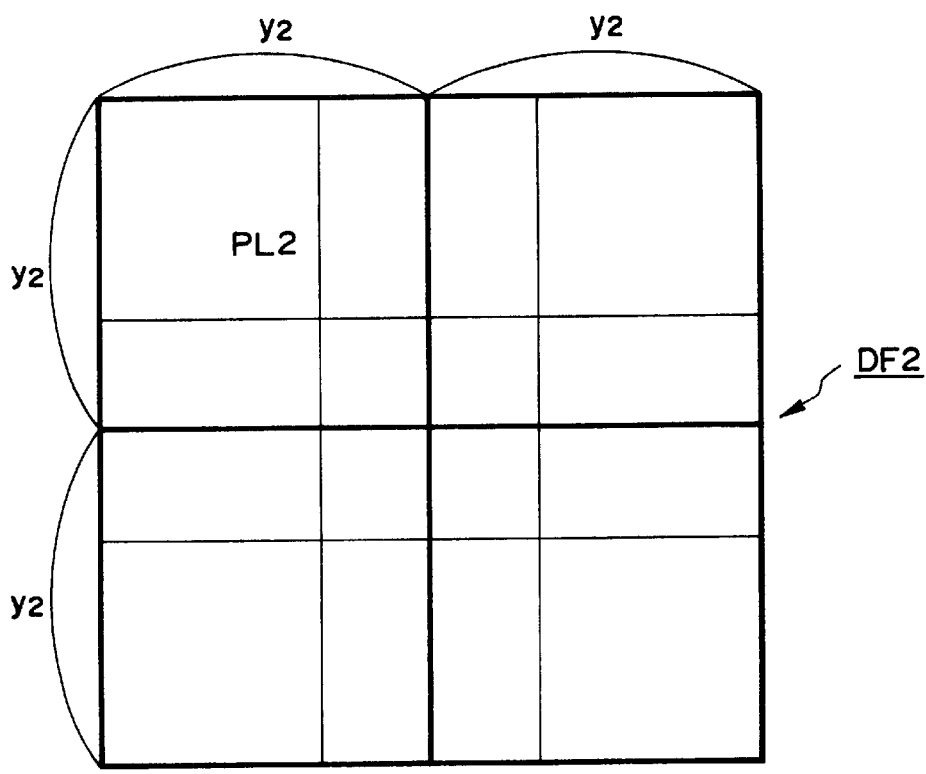
Figure 3:
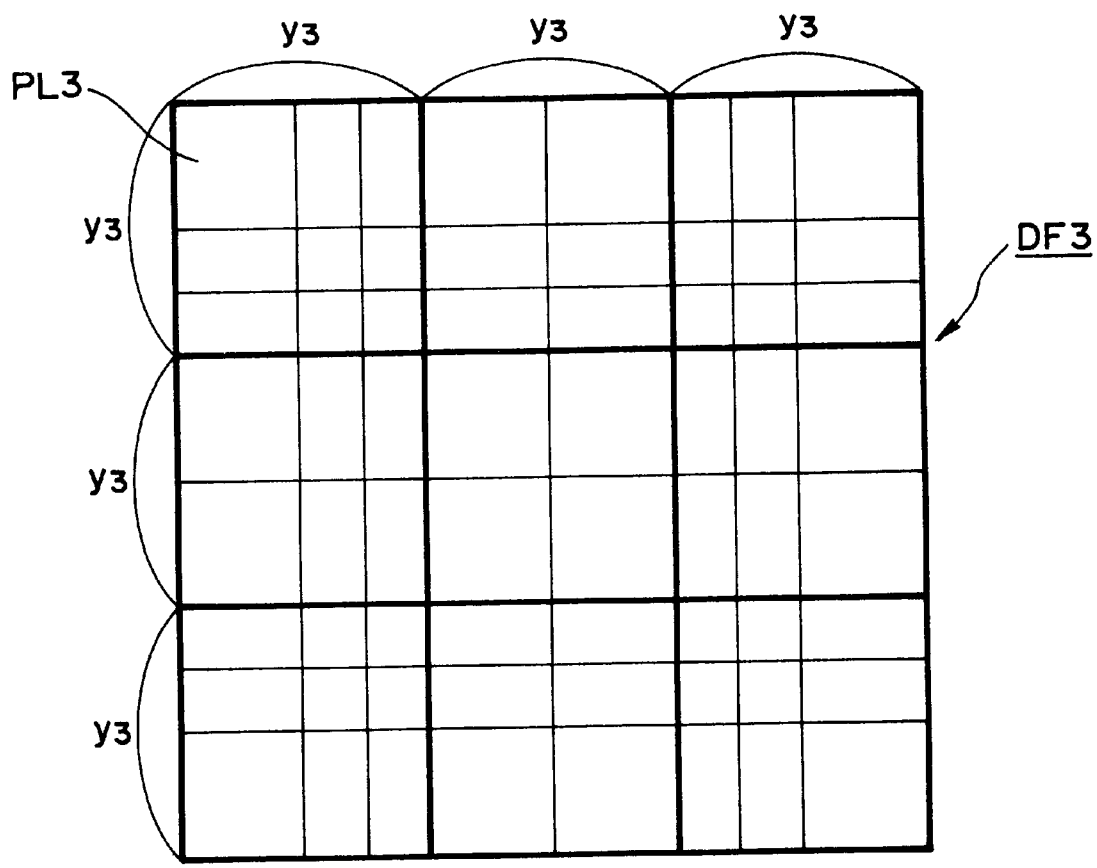

Pixels as the smallest units for displaying data include three types as shown in FIGS. 2A, 2B and 3 respectively.

A first(-type) pixel comprises a square portion composed of a dot PX3 having a side y1, a second(-type) pixel comprises a square portion composed of one dot PX3, two dots PX2 and one dot PX1 having a side y2, and a third(-type) pixel comprises a square portion composed of one dot PX3, four dots PX2 and four dots PX1 having a side y3. The pixels have relative side lengths of 2:3:4, and relative areas of 4:9:16, respectively, in an increasing order.

The first pixel can also be composed of adjacent 2 dots PX2 and can also be composed of adjacent 4 dots PX1. In this way, the first pixel can be composed of three different types of combinations of dots (see DF1 of FIG. 2A).

In this display panel, the second pixel can be composed by only one combination of dots described above (see DF2 of FIG. 2B).

The third pixel can also be composed by a combination of adjacent 2 dots PX1 and 4 dots PX2 in addition to the above-mentioned combination (see DF3 of FIG. 3).

If a combination of 4 dots PX3, 8 dots PX2 and 4 dots PX1 having a side y4 is taken as a basic pattern (FIG. 1), the basic pattern can be equally divided into 9 first pixels and can also be divided into 4 second pixels as shown in FIGS. 2A and 2B.

On the other hand, a combination of 4 adjacent such basic patterns is taken as a basic pattern having a side 2y4, the basic pattern can be equally divided into 36 first pixels and also into 16 second pixels, and can also be equally divided into 9 third pixels as shown in FIG. 3.

The side length ratios among the pixels used in the present invention can be appropriately be determined depending on a desired resolution and, in addition to the above-mentioned 2:3 and 2:3:4, can for example be 3:4, 3:5, . . . , 2:5, 4:5, 4:6, 5:6, 5:7, . . . , corresponding to areal ratios of 4:9. 4:9:16, 9:16, 9:25, . . . 4:25, 16:25, 16:36, 25:36, 25:49 . . . In order to provide an increased general applicability, it is desired to set the ratios so as to provide resolutions applicable to some of VGA, SVGA, XGA and SXGA.

More specifically, it is preferred to provide a display panel having a pixel region comprising at least two types of dots having mutually different areas, wherein the pixel region can be equally divided into first pixels having an effective area S1 and can also be divided into second pixels having an effective area S2, satisfying:

$$S1 < S2 \text{ and } \sqrt{S2} / \sqrt{S1} \neq b \quad (b: \text{ natural number}).$$

[Resolution conversion]

For easy comprehension, a case of exchanging a high-resolution first display mode using a first pixel PL1 as a display unit pixel and a low-resolution second display model using a second pixel PL2 as a display unit pixel will be described with reference to FIGS. 4A–4C.

It is assumed that a basic pattern having a side y4 is arranged in a number of 320 in a horizontal direction and in a number of 240 in a vertical direction. As a result, the first pixel PL1 is arranged horizontally in a number of 960 and vertically in a number of 720. Similarly, the second pixel is arranged horizontally in a number of 640 and vertically in a number of 480.

Figure 4A:
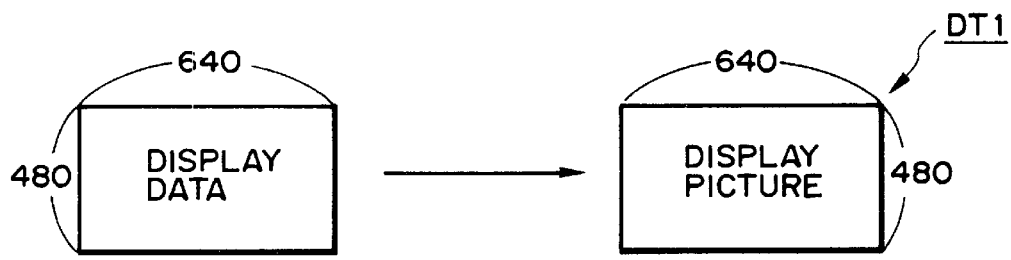
FIGS. 4A–4C illustrate a manner of resolution conversion according to a display panel of the invention.
Figure 4B:
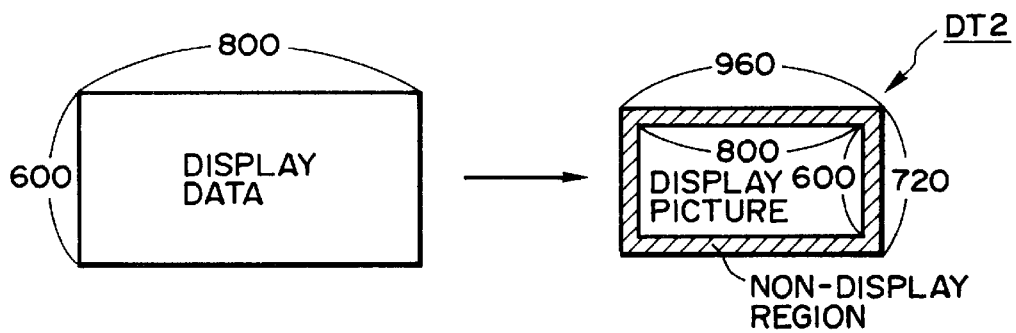
Figure 4C:
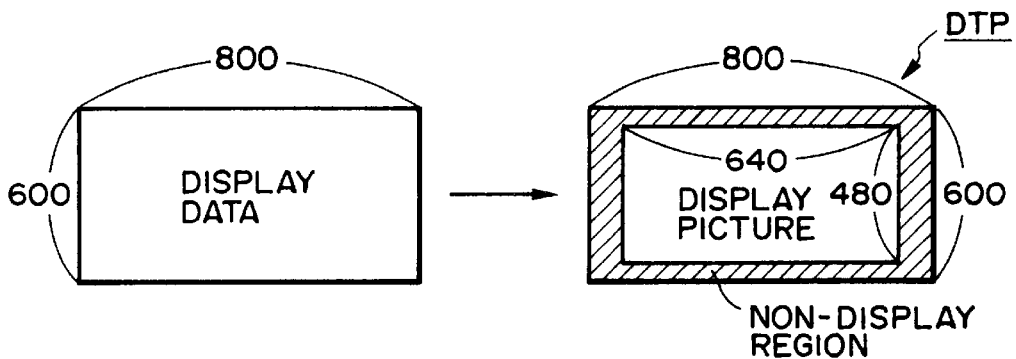

As a result, a display picture can be formed based on display data according to so-called VGA (640×480) specification if the second pixel PL2 is used as a display unit pixel (see DT1 in FIG. 4A). On the other hand, if the first pixel PL1 is used as a display unit pixel, the resolution becomes 960×720 including a larger number of pixels than SVGA resolution (800×600), so that an SVGA picture can be displayed while most effectively utilizing the display picture area (screen) (see DT2 of FIG. 4B). Incidentally, in the case of a color display panel, an identical number of display unit pixels are present for each color of red, blue and green.

In contrast thereto, in the case of using a display panel according to the VGA-specification and composed of single-type dots having an area identical to that of the pixel PL2, a display picture according to the SVGA specification cannot be displayed because of shortage of 160 dots in a horizontal direction and 120 dots in a vertical direction but car only be displayed by using a virtual screen. Anyway, it is impossible to simultaneously display an entire SVGA picture (see DTP in FIG. 4C).

Next, a case of exchanging among three display modes is described, i.e., among a high-resolution first display mode using the first pixel PL1 as a display unit pixel, a medium-resolution second display mode using the second pixel PL2 as a display unit pixel and a low-resolution third pixel PL3 as a display unit pixel.

It is assumed that a basic pattern having a side of 2y4 (=3y3) is arranged horizontally in a number of 214 and vertically in a number of 160 in a display panel. As a result, the first pixel PL1 is arranged in a number of 1284×960. Similarly, the second pixel PL2 is arranged in a number of 856×640, and the third pixel PL3 is arranged in a number of 642×480. Accordingly, by using the pixel PL3 as a display unit pixel, it is possible to effect a display at a resolution according to the so-called VGA-specification. On the other hand, an SVGA picture can be displayed by using the second pixel PL2 as a display unit pixel, and a resolution according to the XGA (1024×768) specification can be displayed by using the first pixel as a display unit pixel.

On the other hand, a panel composed of single-type dots each having an identical area as the first pixel PL1 can effect an XGA display by using one dot as one pixel and a VGA display by using 4 dots as one pixel. However, if an SVGA display is performed by using one dot as one pixel, a large proportion of display picture area including horizontally 480 pixels and vertically 600 pixels becomes a non-display region. On the other hand, in the present invention, an SVGA display may be performed by using the second pixel PL2 as a display unit while leaving only a narrow non-display region including horizontally 56 pixels and vertically 40 pixels.

In a specific resolution conversion example described above, the lowest resolution display mode is selected so as to provide a resolution suitable for the VGA specification, but it is also possible to determine a dot arrangement in a basic pattern so as to provide a high-resolution display mode suitable for the XGA or SXGA (1280×1024) specification.

For example, if the basic pattern in FIG. 1 is arranged in a number of 342×265, a resolution of 1026×768 almost corresponding to that of the XGA is attained by a display mode using the first pixel. On the other hand, in a second display mode using the second pixel, a resolution of 684× 512 is attained allowing a VGA picture display.

On the other hand, a panel having a resolution of 1024× 768 composed of single-type dots having an identical area as that of the first pixel PL1 can effect an XGA display by using one dot as one pixel but, for a VGA display, has a leave horizontally 384× vertically 288 pixels as a non-display region or has to form a virtual screen by using 4 dots as one pixel.

Further, in the present invention, by using a display panel having a diagonal size of picture area of 21 inches, it is possible to effect an exchange between a resolution of 2400×180 (135 DPI) by using the first pixel PL1 and a resolution of 1600×1200 (90 DPI) by using the second pixel PL2.

As described above, in the present invention, the dot pattern per se in the display panel is designed in harmony with resolutions selected by a data processing apparatus such as a computer, it is possible to select between plural displace modes including one using a number of pixels (or a pixel area) which is not $2^n$ times that of another display mode, so that it is possible to obviate a difficulty, such as a large non-display region or failure of displaying an entire picture.

[Display panel]

The display panel used in the present invention may for example be in the form of an electrochromic display panel, a liquid crystal display panel, a plasma display panel, an FED (field emission display) panel having electron emission sources, a DMD (digital micromirror device) panel, or a panel having a light-emission device array such as an array of LEDs.

Among these, a liquid crystal display panel is advantageous in view of features, such as a relatively small power consumption, and easiness for providing a panel of a small-size, light weight and/or large area, and may be embodied as a simple matrix-type, a TFT-active matrix-type or an MIM-type. Particularly, a simple matrix-type panel using a chiral smectic liquid crystal forming a ferroelectric or anti-ferroelectric liquid crystal may be advantageously adopted in the present invention because of easiness for providing a large area and/or a high resolution panel. The liquid crystal panel suitably used in the present invention may have a structure similar to that adopted in a ferroelectric liquid crystal display panel as described in detail in, e.g., U.S. Pat. Nos. 4,655,561; 5,091,723; and 5,189,536.

The present invention is also suitably applicable to a liquid crystal display panel using a bistable twisted-nematic (BTN) liquid crystal as disclosed in "Processing of the 15th International Display Research Conference, October 1995", pp. 259–262. The BTN-liquid crystal assumes two metastable states, which are used for displaying bright and dark states to effect in image display.

The effective area of a (sub-)dot used in a panel in the present invention may for example be defined as an area of a portion at which, a scanning electrode and a data electrode are opposite to each other in a simple matrix-type liquid crystal display panel, or an area of a portion where a common electrode and a pixel electrode (drain electrode) are opposite to each other in an active matrix-type panel. Not restricted to those in such panels, the dot effective area adopted in the present invention can also be an area of a portion defined by a light-shielding member, such as a black matrix. The effective dot area may also be defined as an area of a portion provided with a light-emitting material such as a fluorescent material in the case of a plasma display panel or an FED panel, and may also be defined as an area of a micro-mirror.

[Gradational display]

In the display panel of the present invention, a halftone picture can be displayed by data processing of picture data signals carrying gradation data. This may be effected by modulating at least one of a voltage and a pulse width applied to an optical modulation element such as a liquid crystal, an electron source or a mirror, of a pixel depending on gradation data. More specifically, in the case of a display panel using a TN-liquid crystal, the voltage applied to the liquid crystal at the respective pixels may be modulated depending on given gradation data.

In a display panel of the present invention, it is more suitable to adopt an areal gradational display scheme wherein a prescribed dot is further divided into a plurality of dots (sub-dots) so as to form a bright-state dot and a dark-state dot in a pixel to effect a luminance modulation. Such an areal gradational display scheme is suitable for a type of display panel wherein a (sub-)dot selectively assumes one of two optical states (bright and dark), particularly a display panel having a memory characteristic, specific examples of which may include a ferroelectric liquid crystal display panel and a BTN-liquid crystal display panel.

In the areal gradational display scheme adopted in the present invention, it is suitable to design pixels so that a pixel constituting a principal resolution-level display among a plurality of resolution levels is allowed to display a largest number of gradation levels. Further, the dot division may desirably be performed so as to provide a dot division pattern whereby the gravity center of brightness is less liable to be moved by a change in gradation level. An example of such a dot division is disclosed in EP-A 0671648.

In the present invention, the areal ratios among the sub-dots may preferably be adjusted so that such a dot division for gradational display is applicable at a prescribed resolution level. For example, the dots are divided so as to provide 4 gradation levels in a display mode using the first pixel, and 16 gradation levels in a display mode using the second pixels.

[Color display]

In the present invention, color display may be performed by using plural colors of color-generating materials in the case of spontaneous light-emission-type display panel or by providing color filters in the case of a type of display panel controlling the transmittance or reflectance thereby. The colors of the color-generating material or the filters may be three primary colors of red (R), green (G) and blue (B) or complementary colors of yellow (Y), magenta (M) and cyan (C), or other colors or combinations thereof, e.g., in a special case of reproducing specific colors. It is also possible to further provide non-colored pixels in order to provide an enhanced luminance of white. The present invention may particularly suitably be applicable to a display panel using a color filter, and each dot may have a planar shape and an effective area determined by respective color segments of the color filter and a light-intercepting or partitioning member, such as a black matrix.

Figure 5:
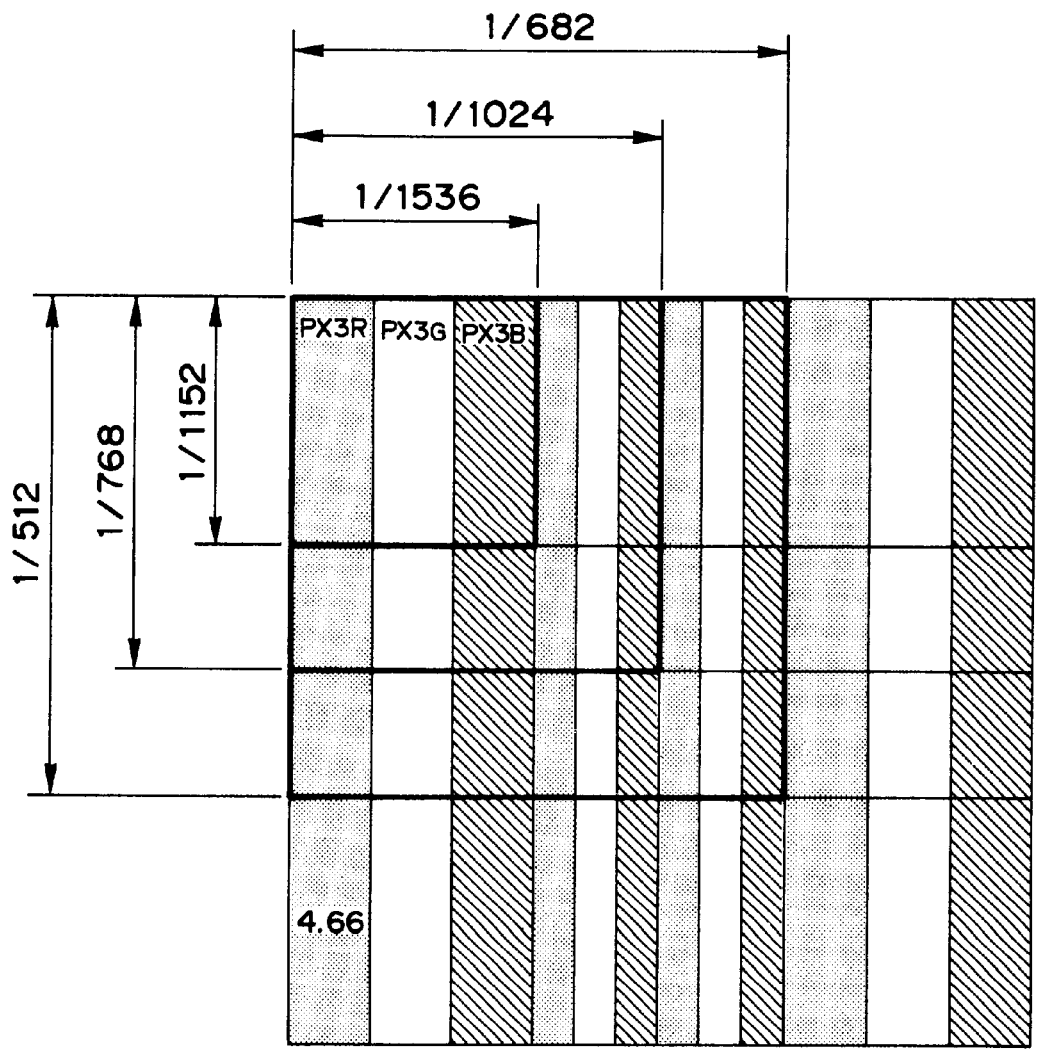
FIG. 5 illustrates a partial pixel arrangement in a color display panel according to a preferred embodiment of the invention

FIG. 5 is a plan view showing a portion (basic pattern) of a display picture in a color display panel. As is understood from a comparison with FIG. 1, each dot is divided into three color dots of mutually different colors. The manner of resolution conversion using the panel is identical to that described with reference to FIGS. 2A, 2B and 3. Herein, an example of division into three colors is shown but division into two colors or four or more colors may also be used for a special purpose.

[Drive]

Figure 6:
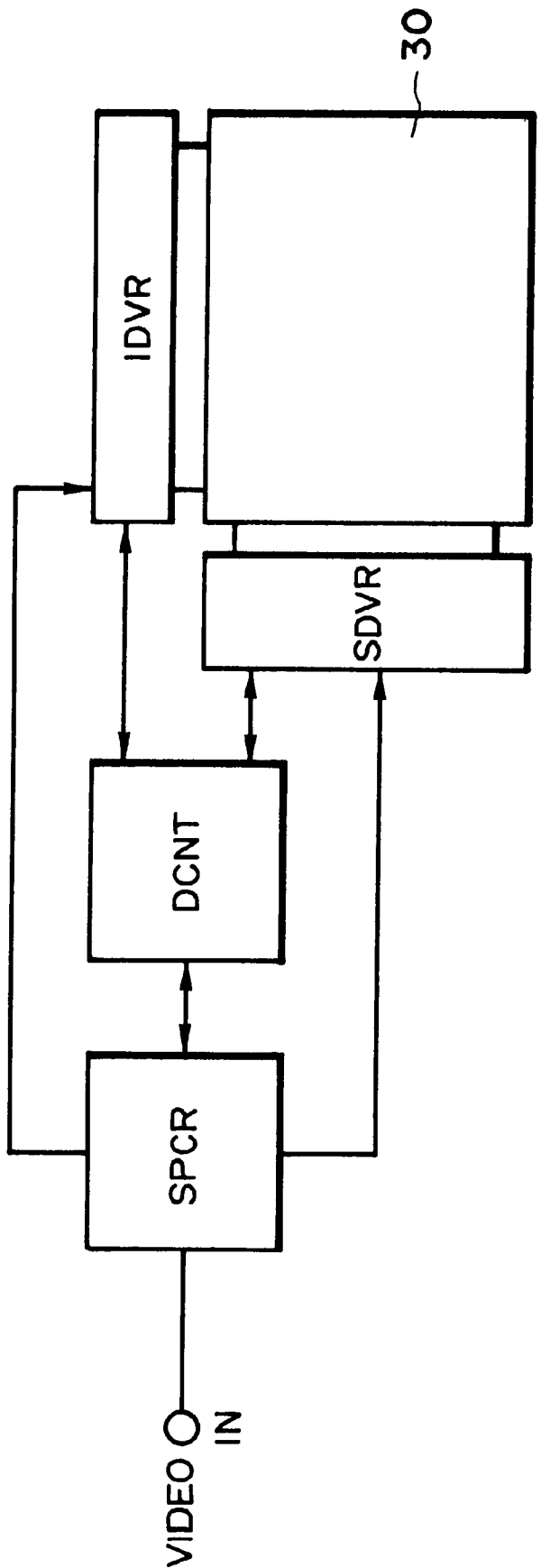
FIG. 6 is a block diagram of a display apparatus according to a preferred embodiment of the invention.

FIG. 6 is a block diagram of a display apparatus including a drive control apparatus according to the present invention. Referring to FIG. 6, the display apparatus includes a display panel 30 having an organization as described above, a data line drive means IDVR for supplying signals to data lines of the display panel 30 and a scanning line drive means SDVR for supplying signals to scanning lines of the display panel 30. These drive means are controlled by a drive control means DCNT and receive signals corresponding to image data to bar displayed from a signal processing means SPCR.

Image data (video data) inputted from an input terminal IN is subjected to detection of a display resolution level and conversion into signals corresponding to the respective dots of the display panel. The converted signals are inputted to the drive means IDVR and SDVR. The drive means IDVR and SDVR generate voltage pulses suitable for driving the display panel depending on the inputted signals and supply the voltage pulses to the scanning lines and the data lines.

The drive means IDVR may desirably be provided with a shift register function, a memory function and a switch function for determining a pulse width.

The drive means SDVR may desirably be provided with a decoder function and a switch function for determining a pulse width, and can also be equipped with a memory or an address detection circuit as desired.

The signal processing means may be required to have a detection function for detecting a resolution level to be displayed and a function of taking a correspondence or concordance between original data and respective dots of the display panel depending on the detected resolution level. In case where the resolution data is inputted together with the image data in advance, the concordance may be performed depending thereon.

[Embodiments]

Hereinbelow, some specific embodiments of the present invention will be described. It should be however noted that the present invention is not restricted to such specific embodiments and respective components may be replaced by substitutes or equivalent for accomplishing the object of the present invention within the scope of the present invention.

(First Embodiment)

A display apparatus according to the First embodiment includes a resolution detection circuit for detecting vertical and horizontal resolutions of inputted picture signals; a picture conversion circuit for converting inputted data into picture data suitable for writing into pixels on scanning lines and adapted to switching between plural conversion methods; a scanning line selection circuit for selecting a scanning line to be scanned and adapted to switching between plural selection modes; a display panel comprising an electrode matrix formed by a multiplicity of electrodes having a plurality of widths forming specified ratios so as to provide a multiplicity of sub-pixels having a plurality of different areas depending on the electrode widths so that a first plurality of sub-pixels constitutes a first pixel capable of displaying a plurality of gradation levels based on a combination of on-state and off-state of the first plurality of sub-pixels in response to a first resolution mode detected by the resolution detection circuit and a second pixel having a size different from that of the first pixel is constituted by a second plurality of sub-pixels including a portion of the first plurality of sub-pixels or a total of the first plurality of sub-pixels in the first pixel and a portion of the first plurality of sub-pixels in an adjacent first pixel in response to a second resolution mode detected by the resolution detection circuit; and control means for controlling a conversion scheme of the picture conversion circuit and a selection scheme of the scanning line selection scheme; whereby the display panel provides a display resolution which varies in a ratio of, e.g., n or 1/n (n: an integer) depending on a picture resolution mode outputted from a personal computer, thereby providing a display picture having a size equal to or close to that of the entire picture area of the display panel in response to a plurality of resolution modes.

Figure 7:
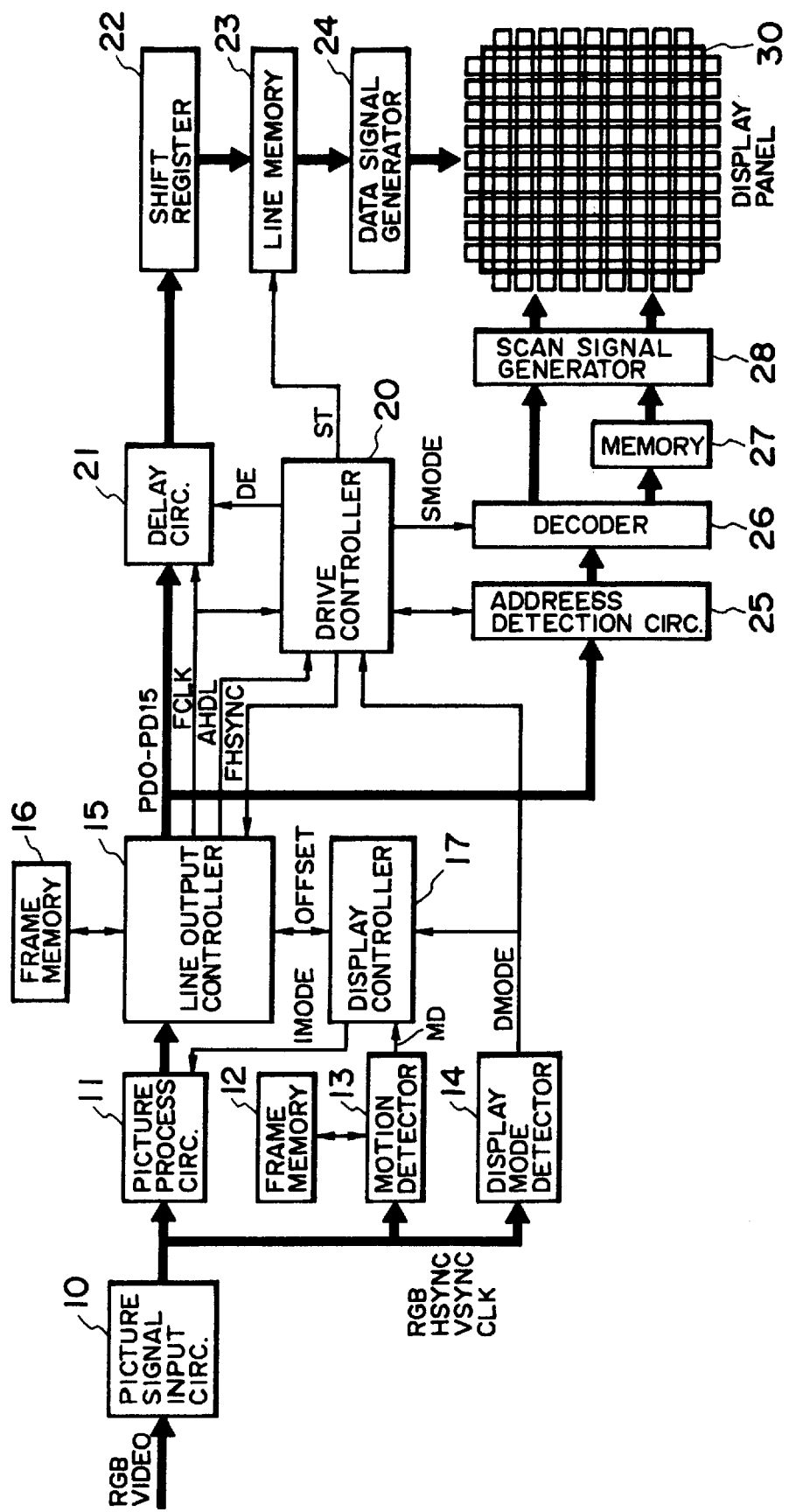
FIG. 7 is a block diagram of a display apparatus according to the First embodiment of the invention.

FIG. 7 is a block diagram of an entire system constituting a display apparatus according to this embodiment. Referring to FIG. 7, the system includes a picture signal input circuit 10 for receiving picture signals from an external data supply, such as a computer or a work station, and generating digital R, G and B signals (RGB), a horizontal synchronizing signal (HSYNC), a vertical synchronizing signal (VSYNC), and pixel clock pulses (CLK); a picture processing circuit 11 for converting the digital RGB signals into picture data for writing into pixels on the scanning lines of a display panel described hereinafter; a frame memory 12 for storing picture data for a previous frame; a motion detection circuit 13 for detecting a certain line on a picture where rewriting has occurred and supplying a detected signal to a display controller 17; a display mode detection circuit 14 for judging vertical and horizontal resolutions of picture data and transmitting a display mode (DMODE) to the display controller 17 and a drive control circuit 20; a line output control circuit 15 for storing data outputted from the picture processing circuit 11 at a frame memory 16 and reading data for one line out of the frame memory 16 to output picture data (PDO–15); and the display controller 17 composed of a microcomputer.

The system further includes a drive control circuit 20 composed of a one-chip micro-computer, a delay circuit 21 for delaying transfer of picture data for writing into pixels on scanning lines, a shift register 22 for serial-parallel conversion of picture data, a line memory 23 for storing picture data for writing into pixels on one scanning line; a data signal generating circuit 24 for generating drive waveform voltages based on picture data, an address detection circuit 25 for detecting address data for designating a scanning line, a decoder 26 for decoding scanning line address data detected by the address detection circuit 25 and designating a scanning line to be selected, a memory 27 for storing designated scanning line data, a scanning signal generating circuit 28 for generating drive waveform voltages so as to drive designated scanning lines based on designated scanning line data from the decoder 26 and the memory 27, and a display panel 30 comprising an electrode matrix composed of scanning lines and data lines and a ferroelectric liquid crystal.

Figure 8:
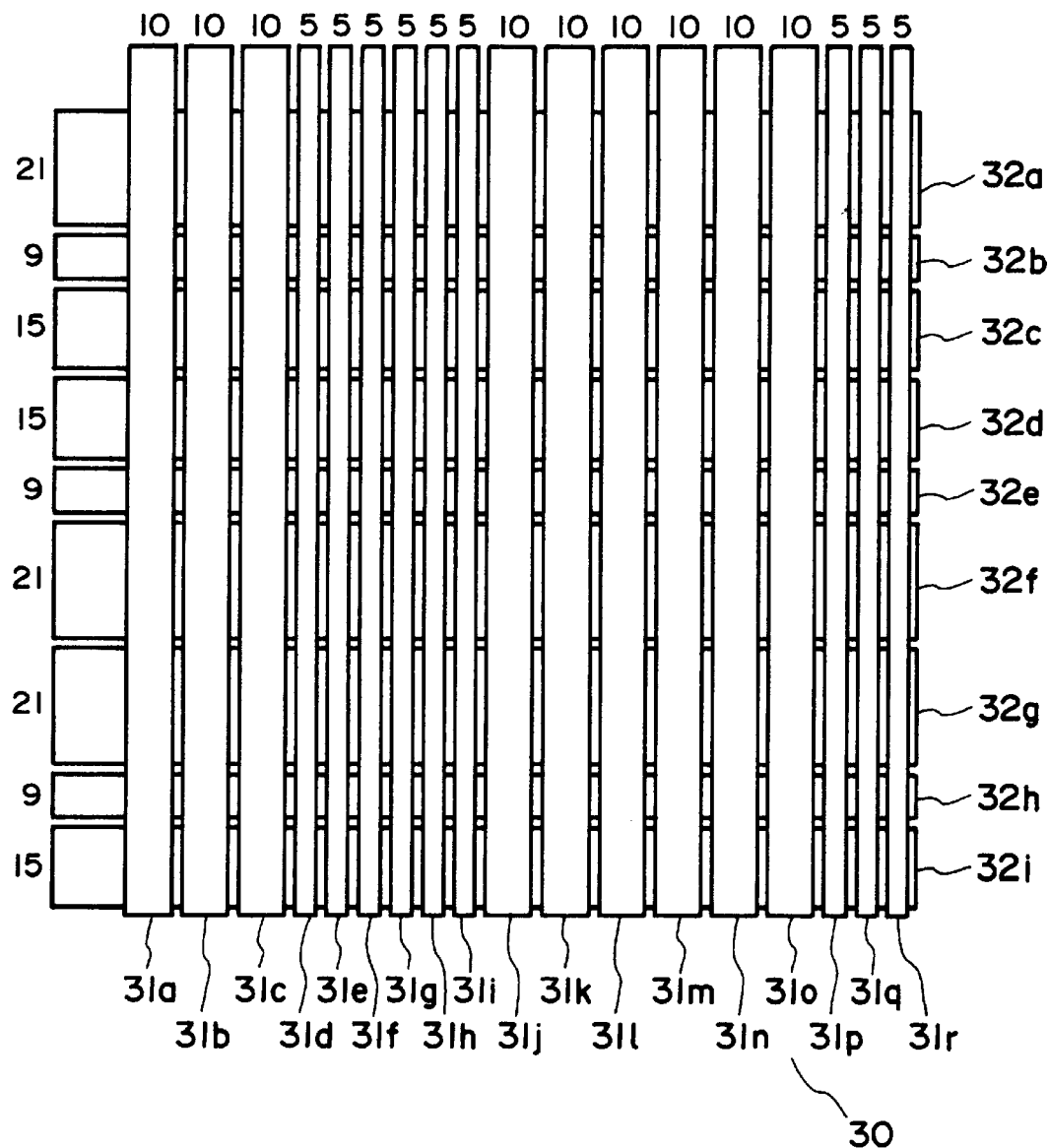
FIG. 8 is a schematic view illustrating an electrode matrix of a display panel used in the First embodiment.

FIG. 8 is a schematic plan view for illustrating an organization of an electrode matrix constituting the display panel 30. The display panel 30 includes data lines (electrodes) 31a–31r and scanning lines (electrodes) 32a–32i. Numerals shown above the respective data electrodes and on the left side of the scanning electrodes represent relative electrode widths, respectively. The data electrodes have been set to have relative widths in the order of 10:10:10:5:5:5:5:5:10:10:10 . . . successively from the left side, and the scanning electrodes have been set to have relative widths in the order of 21:9:15:15:9:21 . . . successively from the upper end.

Figure 9:
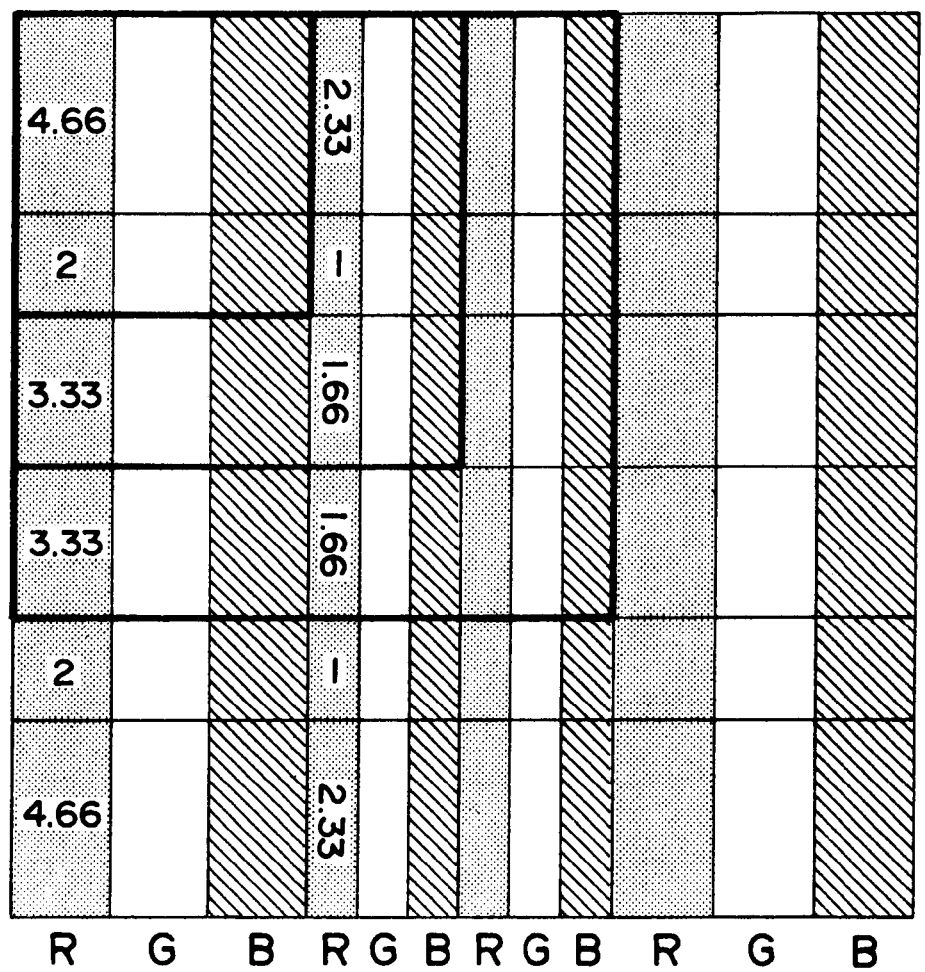
FIG. 9 is a partial pixel arrangement in the display panel used in the First embodiment.

FIG. 9 illustrates a manner of disposition of RGB color filters on a region of the display panel shown in FIG. 8. Stripe-shaped color filters are disposed on the respective data electrodes in the order from the left of RGBRGBRGB . . . Numerals in FIG. 9 represent relative areas of regions defined by overlapping of the respective data electrodes and the respective scanning electrodes. The regions may be called (sub-)dots. Gaps between the (sub-)dots may be masked by a light-intercepting member.

Hereinbelow, the operation of the display apparatus will be described with reference to FIG. 7.

(Picture Signal Input Circuit)

The picture signal input circuit 10 having received RGC video data (picture data) from a computer or a work station outputs RGB digital signals, timing signals (horizontal synchronizing signal HSYNC, vertical synchronizing signal VSYNC, pixel clock pulses CLK) to the picture processing circuit 11, the motion detection circuit 13, and the display mode detection circuit 14.

(Motion Detection Circuit)

On receiving the RGB digital signals according to the timing signals, the motion detection circuit 13 simultaneously reads out picture data for a previous frame stored in the frame memory 12 and compares the data for each pixel. In case where a certain pixel on a certain horizontal line (scanning line) shows a picture data difference between the previous frame data and the current frame data exceeding a prescribed "threshold, the number of the scanning line is outputted as a motion detection signal (MD) to the display controller 17. ps (Display Mode Detection Circuit)

The display mode detection circuit 14 detects vertical and horizontal resolution data from the timing signals (HSYNC, VSYNC, CLK) and supply the resolution data as display mode data (DMODE) to the display controller 17 and the drive control circuit 20.

(Picture Processing Circuit)

The picture processing circuit 11 as a signal processing means in the present invention receives the RGB digital signals as 4-bit data for each of RGB and converts the signals to picture data for writing into pixels on scanning lines of the display panel.

FIGS. 10 and 11 illustrate the conversion by the picture processing circuit 11 and the resultant line data. The picture processing circuit 11 effects three types of conversion according to an instruction (IMODE) from the display controller 17.

In case of IMODE=0, input data for one line is converted into two-line data LD (2n) and LD (2n+1). Upper two bits each of RGC are allotted to LD (2n) line and lower two bits each of RGB are allotted to LD (2n+1) line. In FIG. 10A, PIR3 represents bit 3 of 1st pixel R (red), and P2G1 represents bit 1 of 2nd pixel G (green).

Figure 10B:
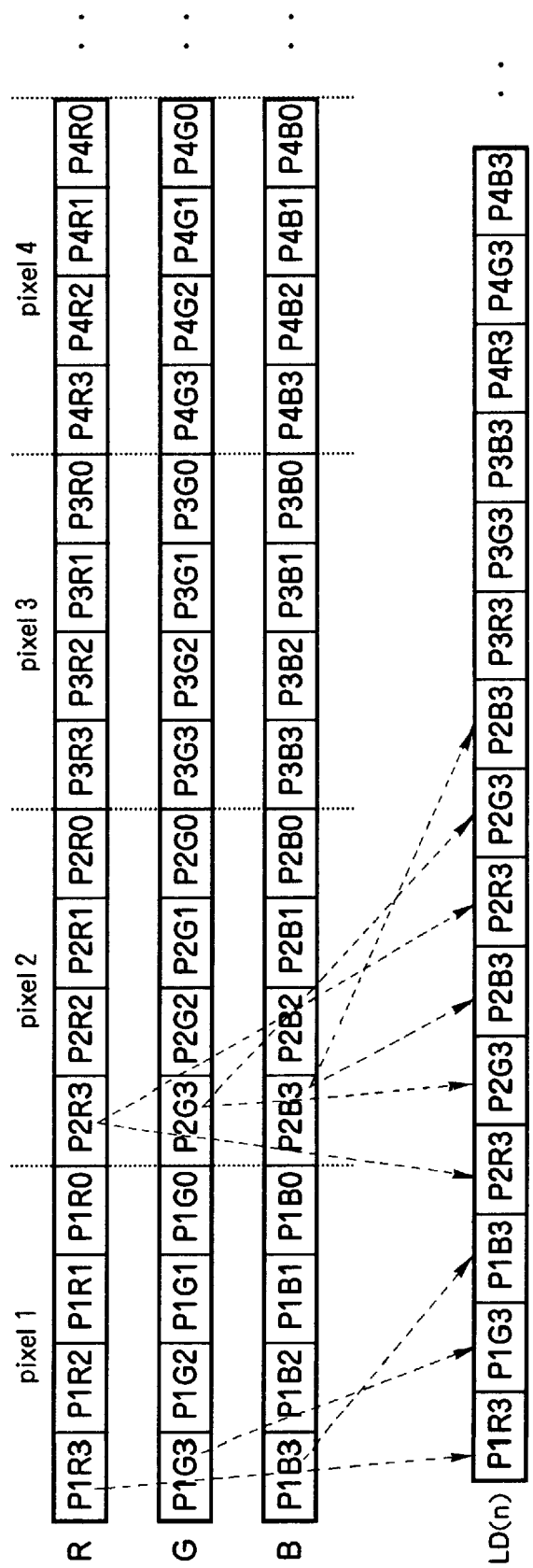

Referring to FIG. 10B, in case of IMODE=1, upper 1 bit only of each of RGB is used to produce one line output data (LD) from one line input data. First (leftmost) picture data is allotted to upper 1 bit each of RGC once. Subsequent picture data is allotted to upper 1 bit each of RGB twice. Then, further subsequent picture data is allotted to upper 1 bit each of RGB once. Thus, output line data is formed. Allotment of respective pixels is as follows:

1st pixel (pixel 1)=RGB, 2nd pixel=RGB×2, 3rd pixel= RGB, 4th pixel=RGB, 5th pixel=RGB×2, 6th pixel= RGB . . .

Referring to FIG. 11, in case of IMODE=2, all 4 bits of RGB each are used to form one-line output data (LD) from one-line input data. Each RGB data (0–15) of each pixel is converted based on a table as shown in FIG. 12 to form an output line data. INPUT shown in the table of FIG. 12 represents values for each color of each pixel (e.g., PlR in FIG. 11) and a and b in OUTPUT of FIG. 12 represent values of PlRa and PlRb corresponding to a certain input value of PlR.

(Line Output Control Circuit)

The line output control circuit 15 stores picture data outputted from the picture processing circuit 11 for writing into pixels on the scanning lines of the display panel in the frame memory 16, and reads out one line data from the frame memory 16 in response to FHSYNC signal supplied from the drive control circuit 20 to output picture data (PDO–15) and scanning line address data (=line numbers) corresponding to the picture data. At this time, which line of picture data should be outputted is determined by an instructionfrom the display controller 17.

(Operation of Display Controller)

The display controller 17 determines scanning lines for routine refresh scanning (=interlaced scanning) and scanning lines for partial rewriting (=non-interlaced scanning) of preferentially scanning a line having caused a change on the display panel in response to a motion detection signal (MD) from the motion detection circuit 13, and supply an instruction to the line output control circuit 15.

FIG. 13 illustrates a flag memory held within the display controller 17. The flag memory includes a number of bits each corresponding to one of the scanning lines of the display panel.

Figure 14:
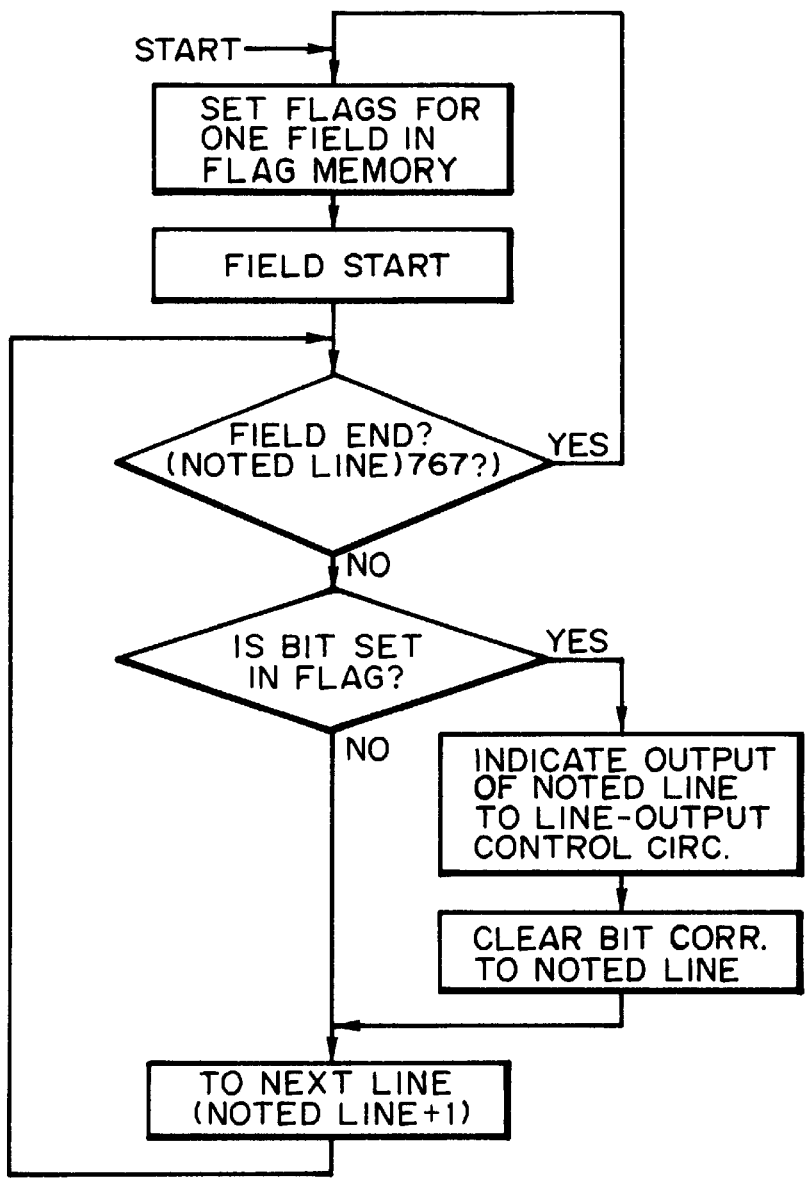
FIGS. 14 and 15 are flow charts each showing process steps of a display controller used in First the embodiment.

The display controller 17 determines a line for output along steps shown in a flow chart of FIG. 14 and instructs the line output control circuit 15. Now, the operation is described with reference to FIG. 14. First of all, the display controller 17 sets flag bits of 1 for one-field refresh scanning as shown in FIG. 13. The flag bits 1 correspond to all the scanning lines subjected to a subsequent one-field refresh scanning. For example, if the refresh scanning is performed by a three-field interlaced scanning, the scanning may be performed in the following sequence:

1st field=0, 3, 6, 9, 12, 15, 18, . . .

2nd field=1, 4, 7, 10, 13, 16, 19, . . .

3rd field=2, 5, 8, 11, 14, 17, 20, . . . For example, at the start of the first scanning, bits corresponding to the lines 0, 3, 6, 9, 12, 15, . . . in the flag memory is set to "1". After completing the bit setting in the flag memory, the display controller 17 inspects the content of the flag memory successively from the uppermost line (lines 0) and, on finding a bit "1", instructs the line output control circuit 15 to output data for a line corresponding to the bit.

Figure 15:
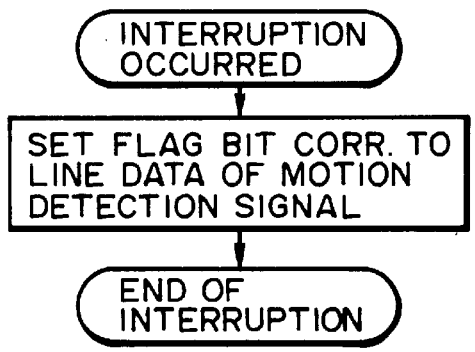

Further, on receiving a motion detection signal from the motion detection circuit 13, the display controller 17 sets internal flag bits corresponding to the relevant scanning lines according to an interruption sequence shown in FIG. 15. Accordingly, when a motion is detected from lines 10–15 as a result of the sequence shown in FIG. 14, the scanning is performed in the order of lines 0, 3, 6, 9, 10, 11, 12, 13, 14, 15 and 18, thus effecting a non-interlaced scanning instead of 3-field interlaced scanning for lines 10 to 15.

(Delay Circuit, Drive Control Circuit)

Figure 16:
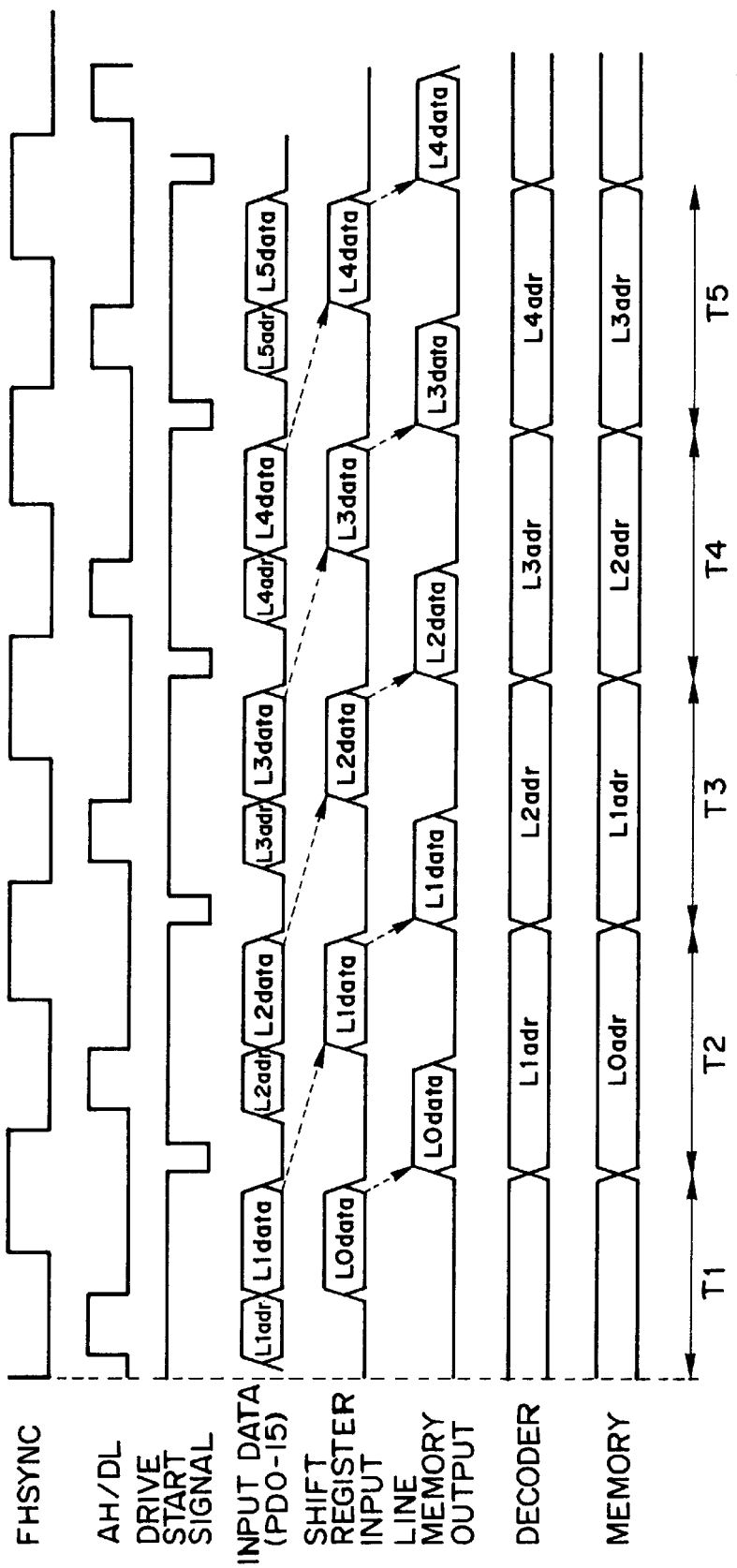
FIG. 16 is a time chart showing a time relationship among a series of operations of a line output control circuit to a display panel.

In period T1 shown in FIG. 16, the drive control circuit 20 sets FHSYNC signal at "L" level to instruct to the line output control circuit 15 that it is ready for receiving data. On detecting the fall of FHSYNC signal, the line output control circuit 15 transfers AH/LD signal and PDO–PD15 (picture data and scanning line address data) in synchronism with FCLK signal. AH/DL signal is also used as a signal for identification of picture data or scanning line address data which are both transferred through a common transmission path. PDO–PD15 transferred during a period when the AH/DL signal is at "H" level are scanning line address data and PDO–PD15 transferred during a period when the AH/DL signal is at "L" level are picture data. On receiving the AH/DL signal, the drive control circuit 20 supplies a delay enable trigger signal (DE) to the delay circuit 21 whereby only the picture data (ID) among the picture data and the scanning line address data is supplied to the delay circuit 21 in synchronism with FCLK signal. On the other hand, the address detection circuit 25 detects only the scanning line address data.

Then, the drive control circuit 20 outputs a drive start signal (ST) and latches the content of the shift register 22 in the line memory 23 and, simultaneously therewith, the scanning line address data is transferred from the address detection circuit 25 to the decoder 26 where the address data is decoded to designate lines to be cleared.

Figure 17:
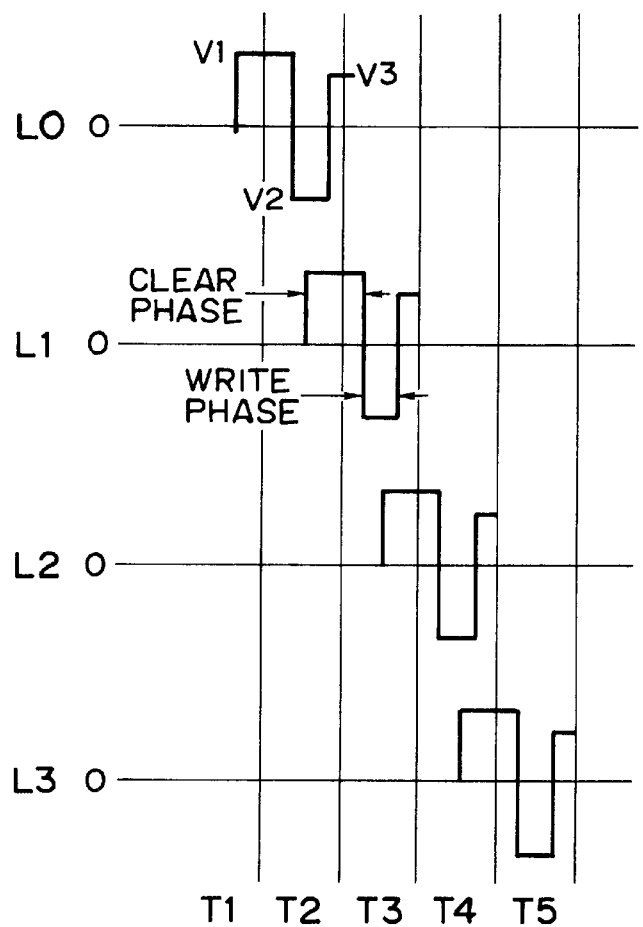
FIG. 17 is a waveform diagram illustrating sequential application scanning signals for driving a display panel of the First embodiment.
Figure 18:
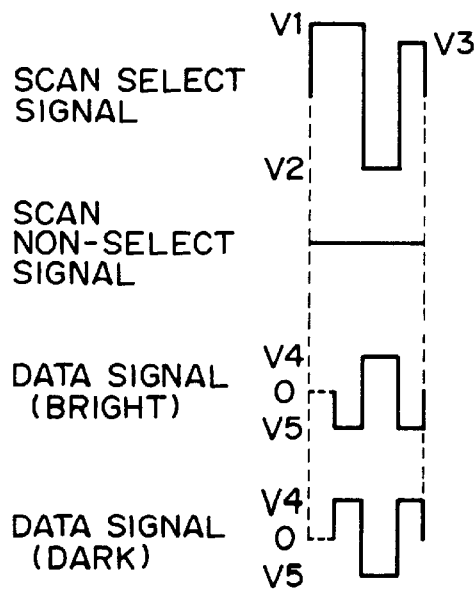
FIG. 18 is a waveform diagram showing a set of unit drive signals used in the First embodiment.

FIG. 17 illustrates a sequential application of a scanning selection to the scanning lines and FIG. 18 shows a set of drive signal waveforms applied to the scanning and data lines.

The period T1 corresponds to a 1H period (i.e., a period for rewriting one line). In a period T2, a drive is initiated by the drive start signal outputted from the drive control circuit. At this time, a scanning line (L1) designated by the decoder 26 is cleared and, simultaneously, picture data is written on a scanning line (L0) set in the memory 27. The set lines L0 and L1 are simultaneously driven by the scanning signal generation circuit 28.

At this time (T2), a voltage in "clear phase" shown in FIG. 17 is applied to the scanning line L1 and a voltage in "write phase" in FIG. 17 is applied to the scanning line L0. Incidentally, FIG. 17 shows a time sequence of applying a scanning selection signal comprising voltage peak values of V1, V2 and V3 and a scanning non-selection signal at a voltage of 0 (as shown in FIG. 18).

On the other hand, the drive control circuit 20 sets FHSYNC signal at level "L" to receive data from the line output control circuit 15 for receiving subsequent data PD0–PD15. Similarly as the above, picture data (corresponding to L2) is transferred to the delay circuit 21 and, simultaneously therewith, previous picture data (corresponding to L1) is transferred to the shift register 22. The address detection circuit 25 detects scanning line address data (corr. to L2). The drive control circuit 25 outputs a drive start signal (ST) to latch picture data (corr. to L1) in the line memory 23. Simultaneously therewith, scanning line address data (corr. to L2) is transferred to the decoder 26 and the designation of the scanning line L1 is set in the memory 27. Similarly, in period T2, the pixels on the scanning line L2 are cleared and the pixels on the scanning line L1 are rewritten into "bright" or "dark" depending on picture data (for L1) stored in the line memory 23. In this way, scanning of the d display panel is continued.

(Decoder)

Figure 19:
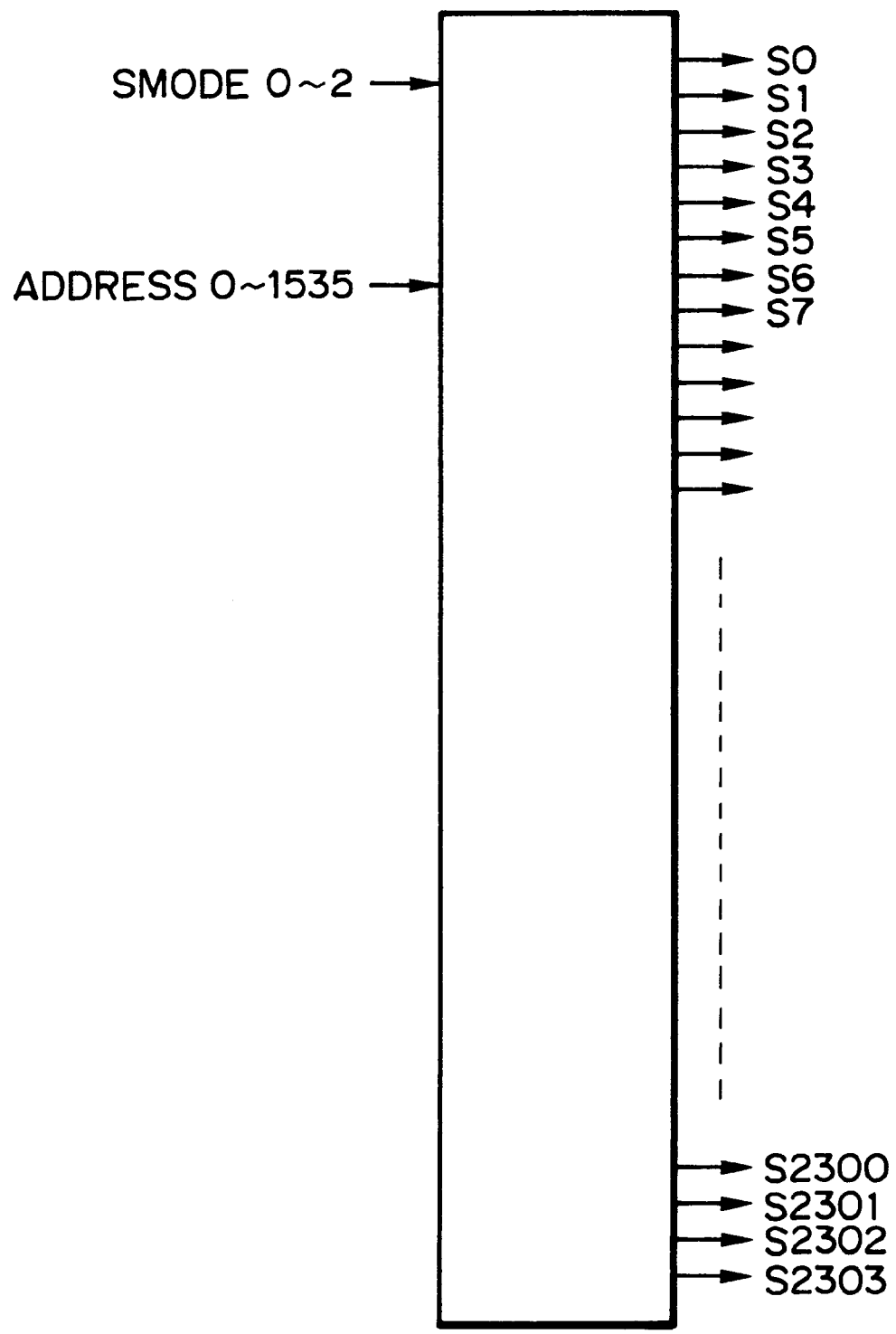
FIG. 19 illustrates a decoder organization used in the First embodiment.

FIG. 19 illustrates an internal organization of the decoder 26. The decoder converts scanning line address data designated by the address detection data 25 into selection signals (S0–11) for putting into active some circuits corresponding to scanning lines actually driven in the scanning signal generation circuit 28. Further, the decoder effects different manners of conversion depending on SMODE signal from the drive control circuit 20. FIGS. 20A, 20B and 21 illustrate the manners of conversion in cases of SMODE=0–2. The left column in each figure (table) indicates scanning line addresses inputted to the decoder, and the right column indicates correspondingly selected scanning lines. In the figure, "1" represents selection and "0" represents non-selection. For example, in case of SMODE=0 (FIG. 20A), when address=0 is inputted, S0 and S2 are "1" indicating the simultaneous selection of 0-th and 2nd scanning lines, corresponding to lines 32*a* and 32*c* in FIG. 8.

The scanning signal generation circuit 28 receives scanning selection signals supplied from both the decoder 26 and the memory 27. The circuit 28 supplies the clear phase portion of a scanning selection signal to a scanning line selected by the decoder 26 and the write phase portion of a scanning selection signal to a scanning line designated by the output of the memory 27, i.e., selected by the decoder 26 1H-period prior thereto. Further, a scanning-nonselection signal is supplied to scanning lines not selected by either of the decoder and memory outputs.

The data signal generation circuit 24 outputs two types of waveform depending on picture data inputted from the line memory 23. For example, when a certain data line is designated as bit "1", "bright" voltage waveform is supplied to the data line to provide a "bright" state on the display panel. On the other hand, in case of bit "0", a "dark" voltage waveform is supplied to a corresponding data line to display a "dark" state on the panel.

The following represents a relationship among DMODE signal outputted from the display mode detection circuit 14, IMODE signal supplied from the display controller 17 to the picture processing circuit 11, SMODE signal supplied from the drive control circuit 20 to the decoder 26, and OFFSET signal supplied from the display controller 17 to the line output control circuit 15.

| (Resolution of input signal) | DMODE | IMODE | SMODE | OFFSET |
|---|---|---|---|---|
| H = 1024, V = 768 | 0 | 0 | 0 | X = 0, Y = 0 |
| H = 1536, V = 1152 | 2 | 1 | 2 | X = 0, Y = 0 |
| H = 768, V = 576 | 1 | 2 | 1 | X = 0, Y = 0 |
| H = 640, V = 480 | 3 | 2 | 1 | X = 64, Y = 48 |

Figure 22:
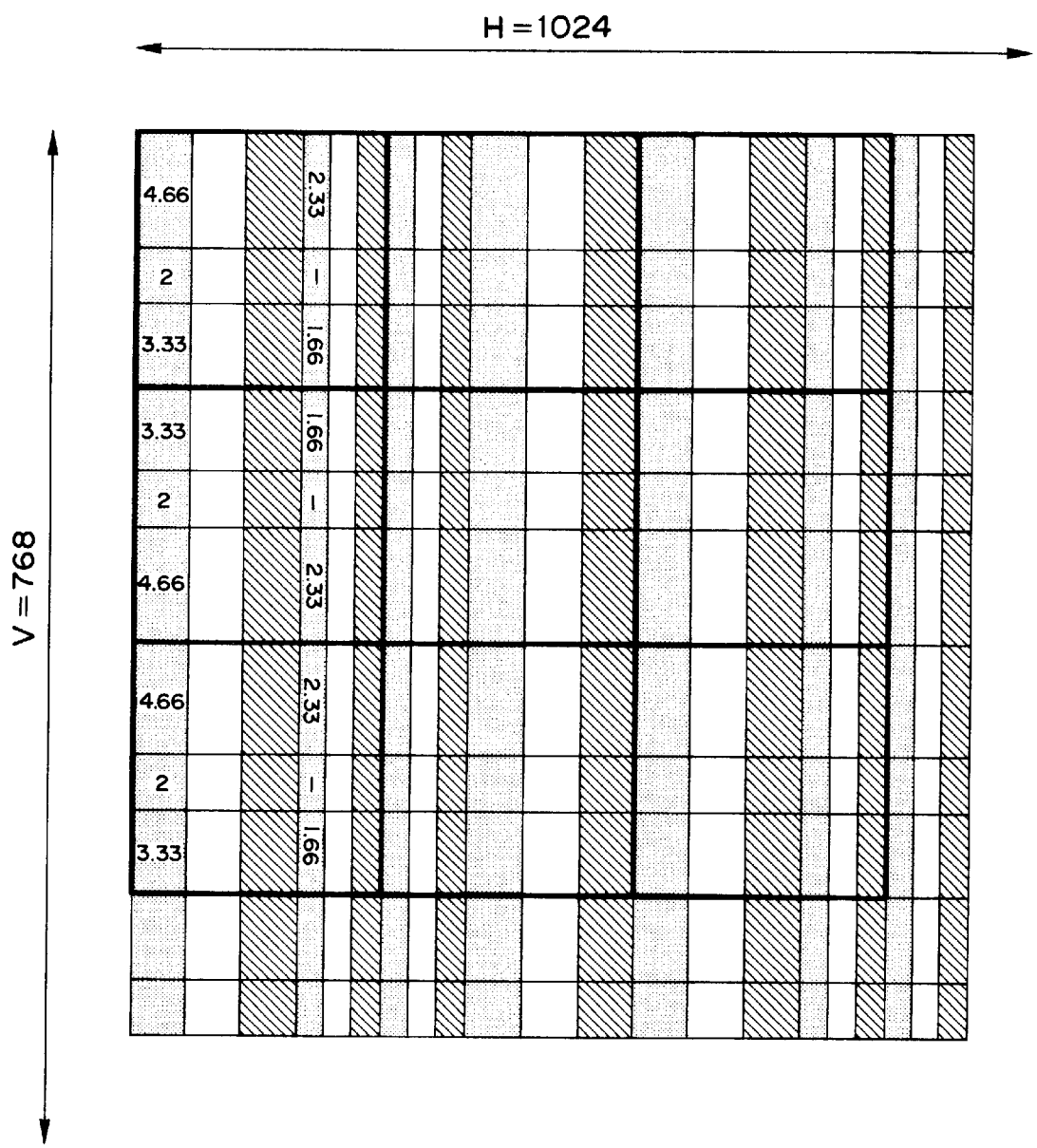
FIG. 22 illustrates pixel units for display at a certain resolution of the display panel in the First embodiment.
Figure 23:
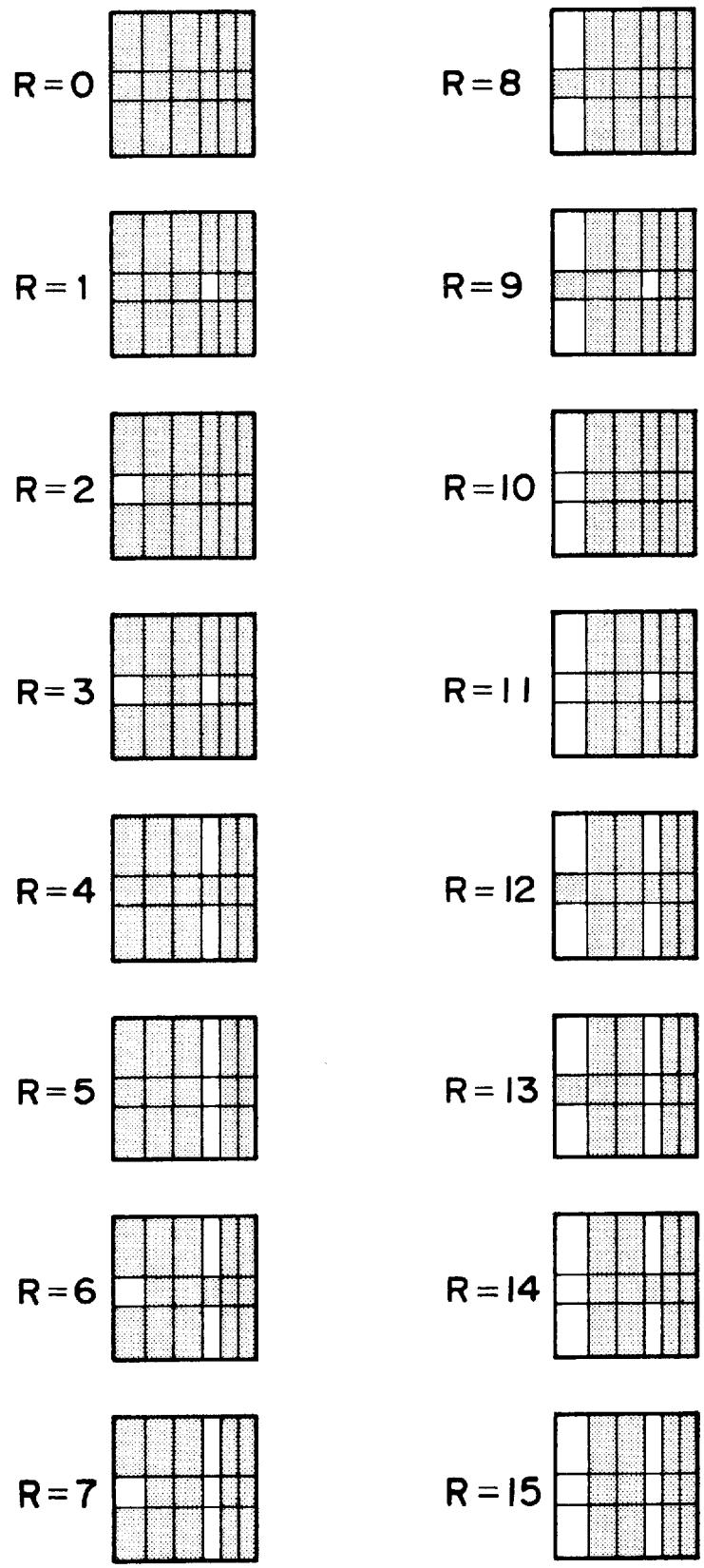
FIG. 23 illustrates a manner of gradational display at the gradation shown in FIG. 22.

Hereinbelow, a display operation of the display apparatus according to the present invention will be described for a case of a host computer issuing a resolution signal of H=1024 and V=768. From a time of receiving the signal, the display mode detection circuit 14 outputs a signal of DMODE=0. On receiving the signal, the display controller 17 outputs IMODE=0 to the picture processing circuit 11, which effects picture data conversion as illustrated in FIG. 10A, whereby two lines of data are outputted from one line of inputted data. On the other hand, the drive control circuit 20 outputs SMODE =0 to the decoder 26, which outputs a scanning selection signal. FIG. 22 shows a region corresponding to one pixel of the display panel 30 at this time. Each pixel is constituted so as to be able to display 16 gradation levels of R0–R15 as shown in FIG. 23 for each of RGB colors (=totally 4096 colors). Hereinbelow, a manner of gradational display is described with reference to the case of red (R) for example.

First of all, in case where data for a leftmost pixel (pixel 1) on line 0 inputted to the picture processing circuit 11 is R=1, G=0 and B=0 (each value ranging from 0 to 15), the content of pixel 1 is "1" for only P1R0 and "0" for all others (i.e., 1, or 0001 in a binary number system). Accordingly, the following two lines of data are outputted from the picture processing circuit:

LD(0): 000000 . . .

LD(1): 000100 . . .

and stored in the frame memory 16.

When these lines of data are outputted from the line output control circuit, line addresses 0 and 1 are detected by the address detection circuit 25 to be inputted to the decoder 26. When address "0" is inputted to the decoder, S0 and S2 are selected (FIG. 20A) to simultaneously select scanning lines 0 and 2 (corr. to 32*a* and 32*c* in FIG. 8). The decoder output is set in the memory 27 and, simultaneously therewith, picture data (corr. to the above LD(0)) is set within the line memory 23 to supply voltage signals corresponding to data (from the left) of 000000 . . . to the data lines (31*a*, 31*b*, 31*c*, 31*d*, 31*e*, 31*f* . . . in FIG. 8). On the other hand, when address "1" is inputted to the decoder, S1 is selected (FIG. 20A) to select scanning line 1 (corr. to 32*b* in FIG. 8). When the decoder output is set in the memory 27, picture data (corr. to the above LD(1)) is set in the line memory 23 to supply voltage signals corresponding to data (from the left) of 000100 . . . to the data lines. When these two times of scanning for writing (on 2 lines+1 line) are completed, the pixel is written as shown at R=1 in FIG. 23 (where only one dot is placed in "bright" and the other dots are in "dark"). The dot written in bright has a relative area of 1, thus providing a brightness level of 1 among 16 levels of gradation ranging from level 0 to level 15.

Then, in case where data for a leftmost pixel (pixel 1) on line 0 inputted to the picture processing circuit 11 is R=12, G=0 and B=0 (each value ranging from 0 to 15), the content of pixel 1 is "1" for P1R3 and P1R2 and "0" for all others (i.e., 12, or 1100 in a binary number system). Accordingly, the following two lines of data are outputted from the picture processing circuit:

LD(0): 100100 . . .
LD(1): 000000 . . .

and stored in the frame memory 16.

When these lines of data are outputted from the line output control circuit, line addresses 0 and 1 are detected by the address detection circuit 25 to be inputted to the decoder 26. When address "0" is inputted to the decoder, S0 and S2 are selected (FIG. 20A) to simultaneously select scanning lines 0 and 2 (corr. to 32*a* and 32*c* in FIG. 8). The decoder output is set in the memory 27 and, simultaneously therewith, picture data (corr. to the above LD(0)) is set within the line memory 23 to supply voltage signals corresponding to data (from the left) of 100100 . . . to the data lines (31*a,* 31*b,* 31*c,* 31*d,* 31*e,* 31*f* . . . in FIG. 8). On the other hand, when address "1" is inputted to the decoder, S1 is selected (FIG. 20A) to select scanning line 1 (corr. to 32*b* in FIG. 8). When the decoder output is set in the memory 27, picture data (corr. to the above LD(1)) is set in the line memory 23 to supply voltage signals corresponding to data (from the left) of 000000 . . . to the data lines. When the scanning for writing is completed, the pixel is written as shown at R=12 in FIG. 23 (where four dots is placed in "bright" and the other dots are in "dark"). The dots written in bright" have relative areas of 4.66+3.33+2.33+1.66= ca. 12, thus providing a brightness level of 12 among 16levels of gradation ranging from level 0 to level 15.

In a similar manner, 16 gradation levels ranging from 0–15 can be displayed corresponding to inputted data.

Figure 24:
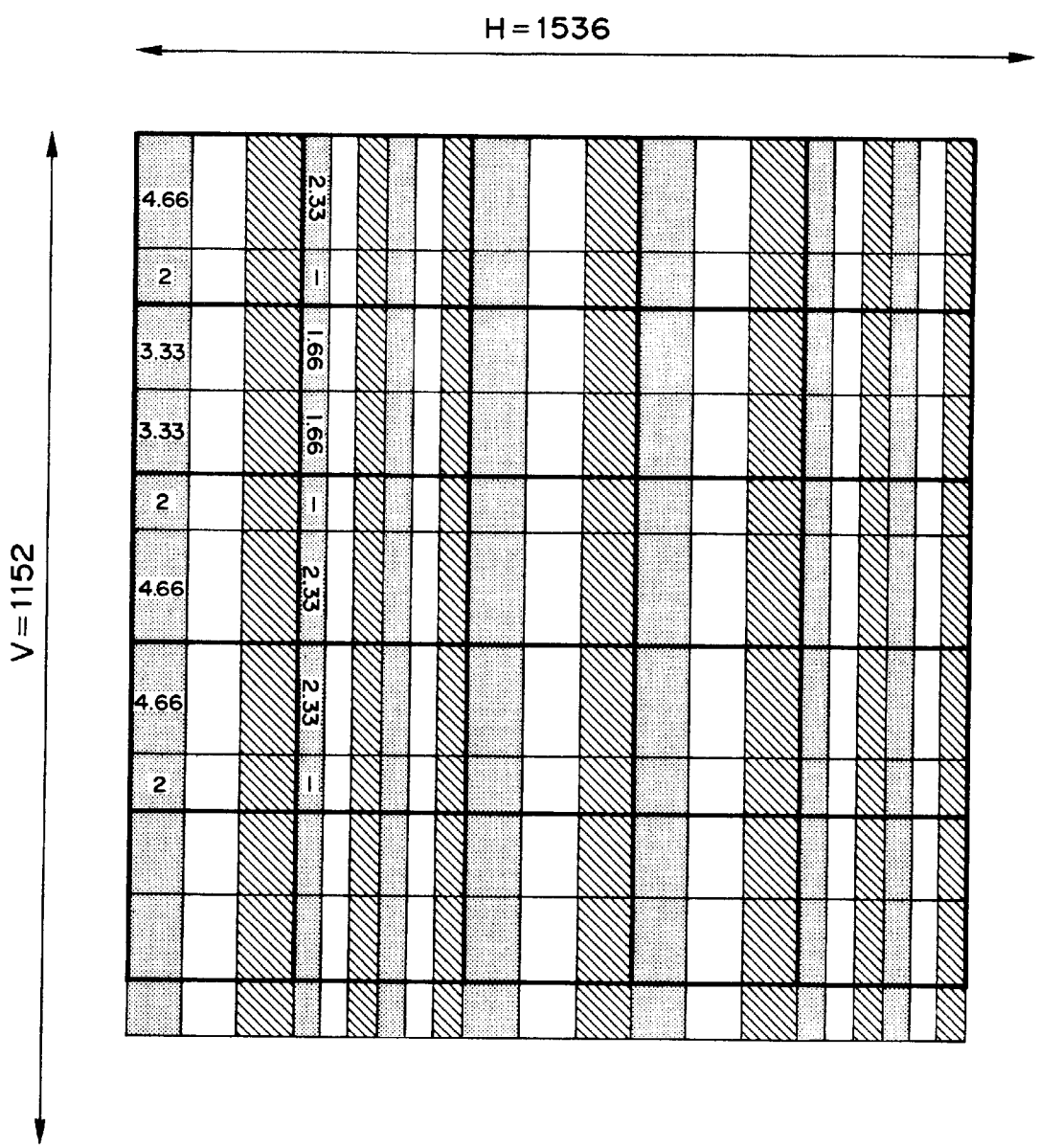
FIGS. 24 and 26 respectively illustrate pixel units for display at another resolution of the display panel in the First embodiment.

Then, in the case of the host computer issuing a resolution signal of H=1536 and V=1152, from the instant of receiving the signal, the display mode detection circuit 14 outputs a signal of DMODE=2. On receiving the signal, the display controller 17 outputs IMODE=1 to the picture processing circuit 11, which effects picture data conversion as illustrated in FIG. 10B, whereby one line of data is outputted from one line of inputted data. On the other hand, the drive control circuit 20 outputs SMODE =2 to the decoder 26, which outputs a scanning selection signal. FIG. 24 shows a region corresponding to one pixel of the display panel 30 at this time. Each pixel is constituted so as to be able to display 2 gradation levels as shown an FIG. 25 for each of RGB colors (=totally 8 colors). Hereinbelow, a manner of gradational display is described with reference to the case of blue (B) for example.

First of all, in case where data for a leftmost pixel and an adjacent pixel on its right side on line 0 inputted to the picture processing circuit 11 are both R=0, G=0 and B=3 (each value ranging from 0 to 15), the content of pixel 1 is "1" for P1B1 and P1B0 and "0" for all others, and the content of pixel 2 is also "1" for P2B1 and P2B0 and "0" for all others. In IMODE=1, only the highest bit among four data bits is used. Accordingly, the following one line of data is outputted from the picture processing circuit:

LD(0): 000000 . . .

and stored in the frame memory 16.

When the line of data is outputted from the line output control circuit, line address 0 is detected by the address detection circuit 25 to be inputted to the decoder 26. When address "0" is inputted to the decoder, S0 and S1 are selected (FIG. 21) to simultaneously select scanning lines 0 and 1 (corr. to 32*a* and 32*b* in FIG. 8). The decoder output is set in the memory 27 and, simultaneously therewith, picture data (corr. to the above LD(0)) is set within the line memory 23 to supply voltage signals corresponding to data (from the left) of 000000 . . . to the data lines (31*a,* 31*b,* 31*c,* 31*d,* 31*e,* 31*f* . . . in FIG. 8). Writing on these two lines is simultaneously effected in one line scanning period. As a result, all the dots are placed in "dark", thus providing a brightness level of 0 of 2 levels of gradation ranging from level 0 to level 1.

Then, in case where data for a leftmost pixel and an adjacent pixel on its right side on line 0 inputted to the picture processing circuit 11 are both R=0, G=0 and B=14 (each value ranging from 0 to 15), the content of pixel 1 is "1" for P1B3, P1B2 and P1B1 and "0" for all others, and the content of pixel 2 is also "1" for P2B3, P2B2 and P2B1 and "0" for all others. In IMODE=1, only the highest bit among four data bits is used. Accordingly, the following one line of data is outputted from the picture processing circuit:

LD(0): 00100100100 . . .

and stored in the frame memory 16.

When the line of data is outputted from the line output control circuit, line address 0 is detected by the address detection circuit 25 to be inputted to the decoder 26. When address "0" is inputted to the decoder, S0 and S1 are selected (FIG. 21) to simultaneously select scanning lines 0 and 1 (corr. to 32*a* and 32*b* in FIG. 8). The decoder output is set in the memory 27 and, simultaneously therewith, picture data (corr. to the above LD(0)) is set within the line memory 23 to supply voltage signals corresponding to data (from the left) of 00100100100 . . . to the data lines (31*a,* 31*b,* 31*c,* 31*d,* 31*e,* 31*f* . . . in FIG. 8). Writing on these two lines is simultaneously effected in one line scanning period. As a result, all the dots are placed in "bright", thus providing a brightness level of 1 of 2 levels of gradation ranging from level 0 to level 1.

Figure 26:
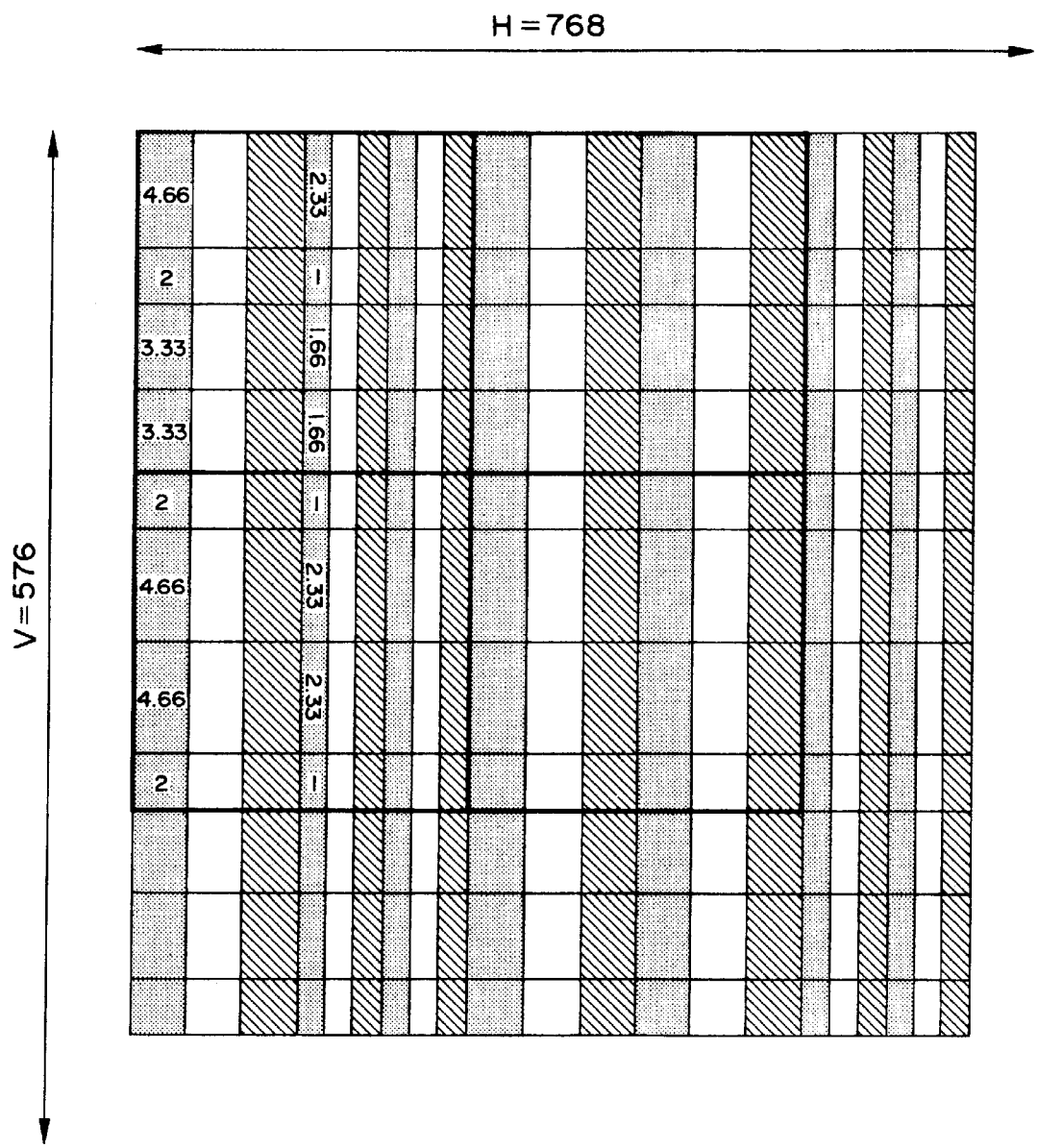

Then, in the case of the host computer issuing a resolution signal of H=768 and V=576, from the instant of receiving the signal, the display mode detection circuit 14 outputs a signal of DMODE=1. On receiving the signal, the display controller 17 outputs IMODE=2 to the picture processing circuit 11, which effects picture data conversion as illustrated in FIG. 11, whereby one line of data is outputted from one line of inputted data. On the other hand, the drive control circuit 20) outputs SMODE =1 to the decoder 26, which outputs a scanning selection signal. FIG. 26 shows a region corresponding to one pixel of the display panel 30 at this time. Each pixel is constituted so as to be able to display 3 gradation levels as shown in FIG. 27 for each of RGB colors (=totally 27 colors). Hereinbelow, a manner of gradational display is described with reference to the case of green (G) for example.

First of all, in case where data for a leftmost pixel (pixel 1) on line 0 inputted to the picture processing circuit 11 is R=0, G=5 and B=0 (each value ranging from 0 to 15), the content of pixel 1 is "0" for P1Ga, "1" for P1Gb and "0" for all others. Accordingly, the following one line of data is outputted from the picture processing circuit:

LD(0): 000010010 . . .

and stored in the frame memory 16.

When the line data is outputted from the line output control circuit, line address 0 is detected by the address detection circuit 25 to be inputted to the decoder 26. When address "0" is inputted to the decoder, S0, S1, S2 and S3 are selected (FIG. 20B) to simultaneously select scanning lines 0–3 (corr. to 32*a*–32*d* in FIG. 8). The decoder output is set in the memory 27 and, simultaneously therewith, picture data (corr. to the above LD(0)) is set within the line memory 23 to supply voltage signals corresponding to data (from the left) of 000010010 . . . to the data lines (31*a,* 31*b,* 31*c,* 31*d,* 31*e,* 31*f* . . . in FIG. 8). Writing on these four lines is simultaneously effected in one line scanning period. As a result, as shown at G=1 (FIG. 27B), 8 dots are placed in "bright". The dots in "bright" states have a relative area of 13.33 among 0, 13.33 and 26.66, thus providing a brightness level of 1 among three gradation levels of 0, 1 and 2.

Then, in case where data for a leftmost pixel (pixel 1) on line 0 inputted to the picture processing circuit 11 is R=0, G=13 and B=0 (each value ranging from 0 to 15), the content of pixel 1 is "1" for both P1Ga and P1Gb and "0" for all others. Accordingly, the following one line of data is outputted from the picture processing circuit:

LD(0): 010010010 . . .

and stored in the frame memory 16.

When the line data is outputted from the line output control circuit, line address 0 is detected by the address detection circuit 25 to be inputted to the decoder 26. When address "0" is inputted to the decoder, S0, S1, S2 and S3 are selected (FIG. 20B) to simultaneously select scanning lines 0–3 (corr. to 32a–32d in FIG. 8). The decoder output is set in the memory 27 and, simultaneously therewith, picture data (corr. to the above LD(0)) is set within the line memory 23 to supply voltage signals corresponding to data (from the left) of 010010010 . . . to the data lines (31a, 31b, 31c, 31d, 31e, 31f . . . in FIG. 8). Writing on these four lines is simultaneously effected in one line scanning period. As a result, as shown at G=2 (FIG. 27C), all green (G) dots are placed in "bright". The dots in "bright" states have a relative area of 26.66 among 0, 13.33 and 26.66, thus providing a brightness level of 2 among three gradation levels of 0, 1 and 2.

Further, also in the case of the host computer issuing a resolution signal of H=640 and V =480, the mode signals are DMODE=1, IMODE=2 and SMODE 1. In this case, the picture is not displayed over the entire display panel. However, in the operation of storing picture data in the frame memory 16, the line output control circuit 15 effects the storage with a point of X=64 and Y=48 as the upper left corner on the frame memory in response to OFFSET signal, whereby the picture is displayed at the center of the display panel.

The above description merely refers to an embodiment of the present invention. For example, in view of the essential nature of the present invention, the present invention does not depend on the number of colors to be displayed.

Hereinbelow, a modification of dot pattern on the display panel will be described.

(Second Embodiment)

Figure 28:
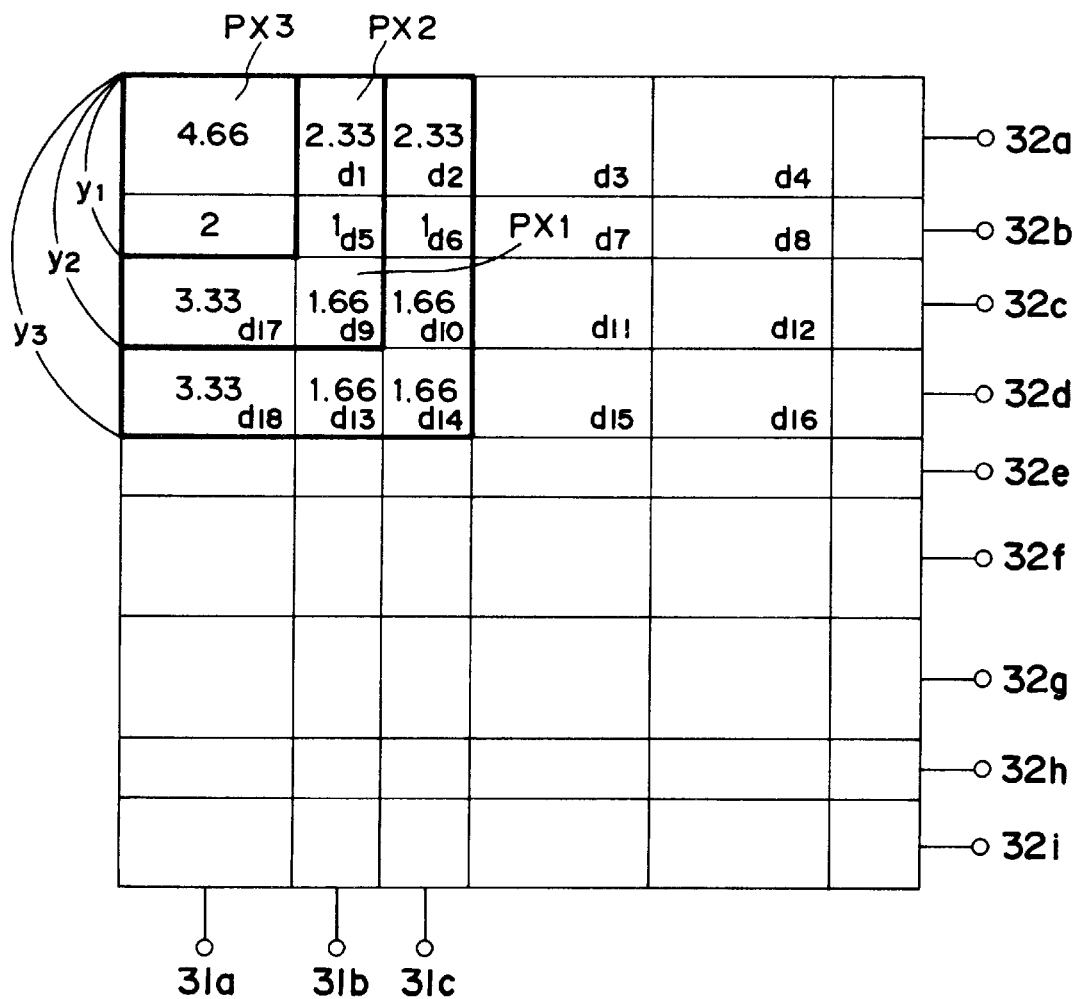

FIG. 28 is a schematic plan view showing a partial pixel engagement in a display panel according to this embodiment.

The difference from the First embodiment is that the display panel in this embodiment is one for monochromatic display and therefore each pixel is not divided into color pixels of RGB.

However, so as to allow a gradational display similarly as in the First embodiment, a square dot PX3 having a side y1 is divided into two sub-dots having an areal ratio of 2:4.66, respectively, and a rectangular dot PX2 having a side y1 and another side (y2–y1) is divided into the sub-dots having an areal ratio of 1:2.33. Thus, numerals in the figure refer to relative areas of respective sub-dots.

Referring to FIG. 28, a first pixel for providing a first resolution is formed by a single dot PX3 composed of two sub-dots having relative areas of 2 and 4.66. Another first pixel is composed of totally four sub-dots including two sub-dots each having a relative area of 2.33 and two sub-dots each having a relative area of 1. Another first pixel is composed of two sub-dots each having a relative area of 3.33, and still another first pixel is composed of four sub-dots each having a relative area of 1.66.

Display at a second resolution may be performed by using a second pixel.

A sub-dot having a (relative) area of 4.66 and a sub-dot having an area of 3.33 assume an identical display state in response to identical picture data. Similarly, a sub-dot having an area of 2.33 and a sub-dot having an area of 1.66 assume an identical display state in response to identical picture data. Thus, a gradational display at 16 levels may be effected. The drive therefor may for example be performed in the following manner.

First, two scanning lines 32a and 32c are simultaneously selected, a data signal for placing the sub-dots having areas of 4.66 and 3.33 in "bright" or "dark" state is supplied to a data line 31a and a data signal for placing the sub-dots having areas 2.33 and 1.66 in "bright" or "dark" state is supplied to a data line 31b.

Then, a scanning line 32b is selected, and data signals are supplied to the data lines 31a and 31b to determine the display states of the sub-dots having areas 2 and 1.

As a scanning scheme for the whole scanning lines, it is preferred to adopt a line-sequential scanning scheme wherein at least one scanning line is selected sequentially while supplying data signals to all the data lines in parallel. As a specific scanning line selection sequence, for example, two lines each of scanning lines are selected successively, e.g., in the order of 32a and 32c, 32d and 32f, 32g and 32i . . . in a first field, and then one line each of scanning lines is selected sequentially, e.g., in the order of 32b, 32e, 32h . . . in a second field, so as to select all the scanning lines in one frame=two fields).

Display at a third resolution may be formed by using square third pixels each having a side of y3, e.g., in the following manner, scanning lines 32a and 32b are simultaneously selected, and then scanning lines 32c and 32d are simultaneously selected so as to determine a display state of "bright" or "dark" for each square pixel (first pixel) having a side of y1, whereby a gradational display at 5 levels may be effected.

It is also possible to effect a gradational at three levels by simultaneously selecting four scanning lines for one third pixel while independently supplying data signals to two combinations appropriately selected from three (or two) data lines for one third pixel.

A characteristic feature of this embodiment is that the second pixel for providing a second resolution formed on three scanning lines (e.g., 32a, 32b and 32c) is composed of three regions including two regions on the lines 32a and 32c which have mutually unequal areas (instead of having an areal ratio of 1:1). As a result, it becomes possible to suppress the occurrence of a difference in brightness increment for respective steps among 16 levels of gradational display.

For this purpose, mutually different three sub-dots (those having areas of 2, 3.33 and 4.66 or those having areas of 1, 1.66 and 2.33) on three scanning lines for constituting a second pixel are so designed that one sub-dot has the smallest effective area (2 or 1) which is 1/n (n is in the range of 3.9–4.1; 3.995 or 3.990 close to 4 in this embodiment) of the total of the effective areas of the other two sub-dots (7.99 or 3.99).

On the other hand, the total of the effective areas (4.99) of three sub-dots on one data line 31b is designed to be 1/m (m is in the range of 1.9–2.1; 2.002 close to 2 in this embodiment) of the total effective area (9.99) of the three sub-dots on another data line 31a.

In other words, in this embodiment, one first pixel (e.g., PX3) is divided into two sub-dots having effective areas in a ratio of 2:4.66, of which a sub-dot having a larger effective area provides a total effective area with a sub-dot having an effective area of 3.33 in adjacent another first pixel, so that the total effective area is ca. 4 times the effective area of 2 of the sub-dot having a smaller effective area.

Similarly, the total effective area of four sub-dots including two sub-dots having an effective area of 2.33 in a certain first pixel and two sub-dots having an effective area of 1.66 in adjacent another sub-dot is set to be ca. 4 times the total effective area of two sub-dots having an effective area 1 in the certain first pixel.

Further, the sub-dots in mutually adjacent two second pixels are designed to have mutually substantially equal areas. That is, sub-dots d1 and d2, d3 and d4, d5 and d6, d7 and d8, . . . d15 and d16, and d17 and d18 have mutually effective areas in respective pairs.

As a result, in the display at a second resolution using second pixels, it is possible to effect a multi-level gradational display at 16 levels, and it is also possible to suppress the movement of a gravity center of brightness in a vertical direction, i.e., in the direction of arrangement of scanning lines.

If each sub-dot in the panel of FIG. 28 is divided into respective unit color dots, a color display panel can be formed. For example, the division into three colors of RGB provides a color display panel identical to the one of FIG. 9.
(Third Embodiment)

Figure 29:
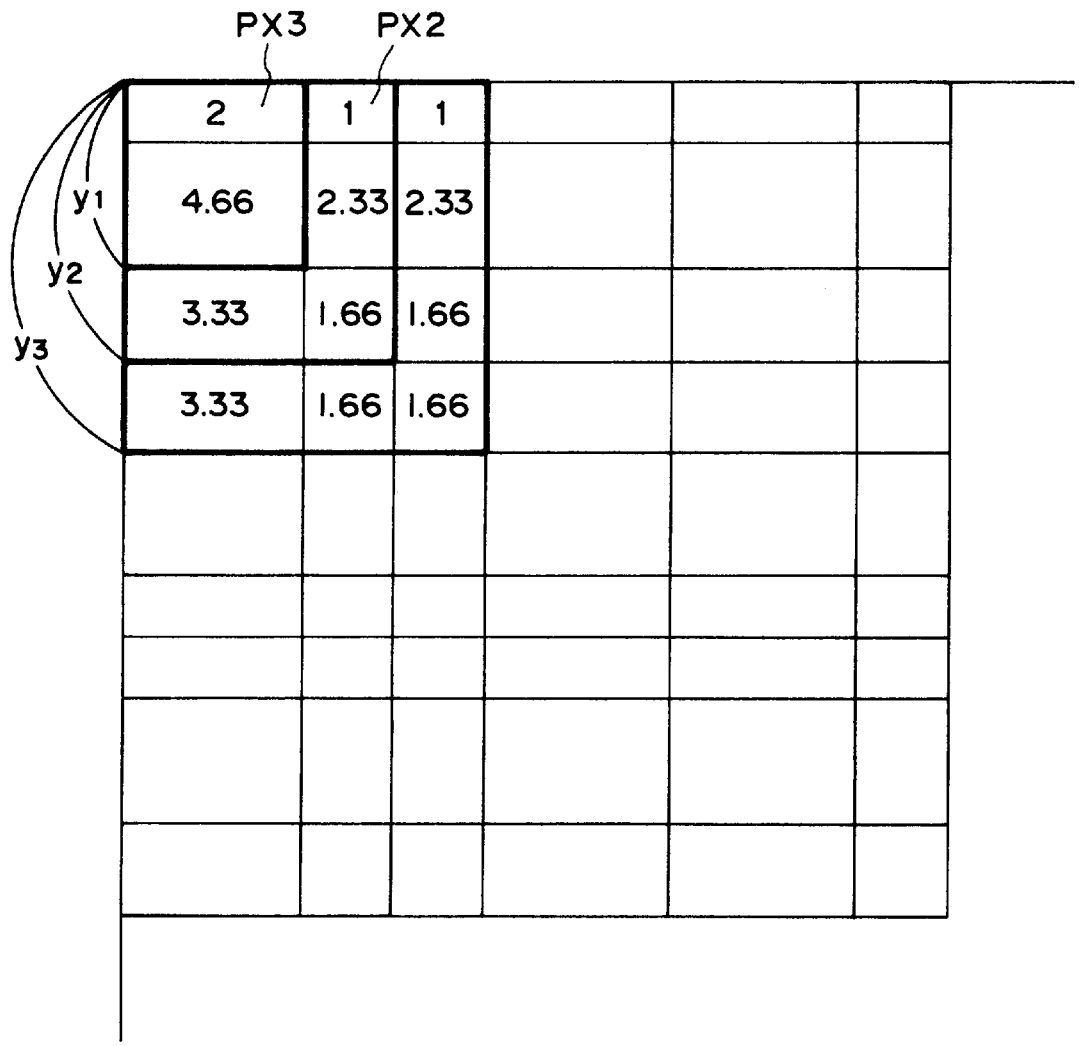

FIG. 29 is a schematic plan view showing a partial pixel arrangement in a display panel according to this embodiment.

The display panel of this embodiment is different from the one of the Second embodiment in that dots PX2 and PX3 each having a longitudinal length y1 are each divided into sub-dot so that a smaller sub-dot is above a larger sub-dots.

These sub-dots can be further divided into respective color dots so as to allow color display.
(Fourth Embodiment)

Figure 30:
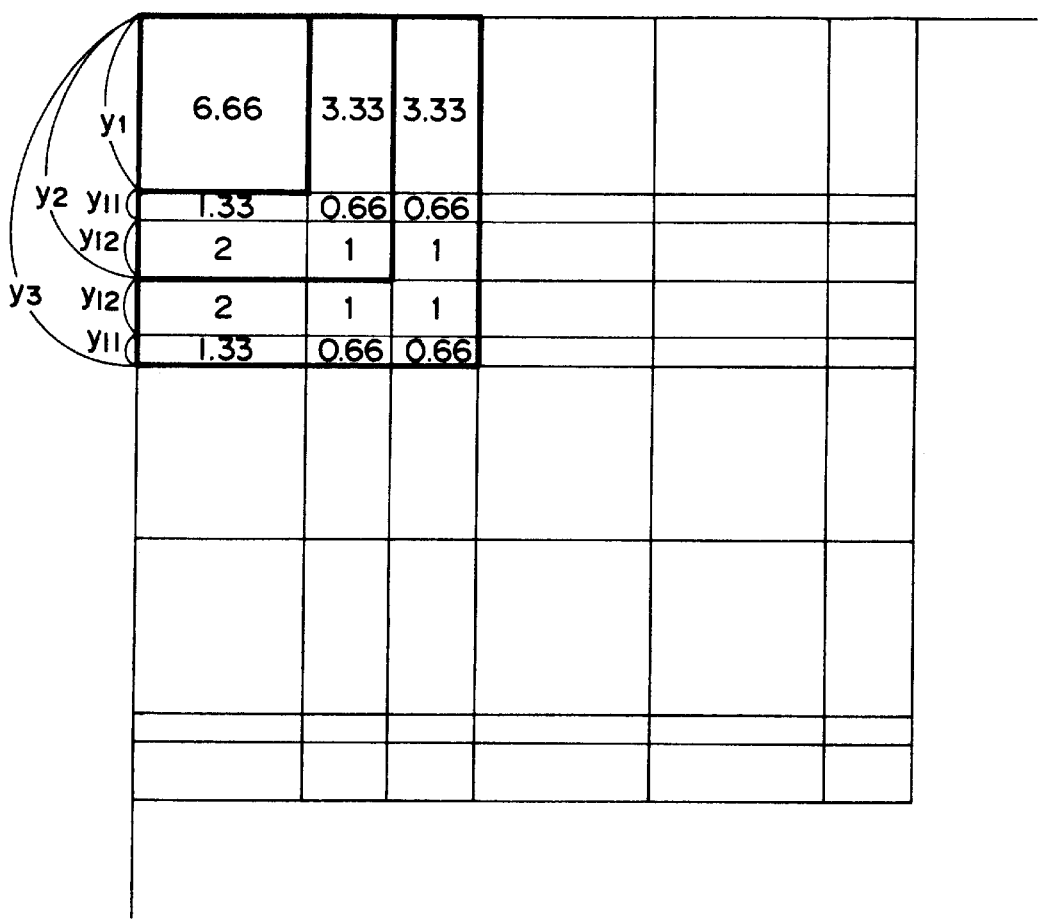

FIG. 30 is a schematic plan view showing a partial pixel arrangement in a display panel according to this embodiment.

The display panel of this embodiment is different from the one of the Second embodiment in that the sub-dots having relative areas of 3.33 and 1.66 are each divided into two sub-dots having vertical lengths y11 and y12, respectively.

These sub-dots can be further divided into respective color dots so as to allow color display.
(Fifth Embodiment)

FIG. 31 is a schematic plan view showing a partial pixel arrangement in a display panel according to this embodiment.

The display panel of this embodiment is different from the one of the Second embodiment in that it uses different ratios of division into sub-dots. Numerals in FIG. 31 (and subsequent figures) represent relative areas of the respective sub-dots.

FIGS. 32A–35D illustrate a manner of gradational display at 16 levels according to a standard mode and FIGS. 36A–39D illustrate a manner of gradational display at 16 levels according to a low-resolution mode, respectively by using the display panel of this embodiment.

As described above, according to the present invention, a display apparatus including a single matrix-type display panel can be supplied with picture signals at plural resolutions while changing one pixel size in response to an inputted resolution level, so that it becomes possible to display a clear picture with panel pixels having a 1:1 correspondence with pixels of inputted picture data while obviating conventional difficulties such as a reduction in display area and blurring or non-naturalness due to interpolation or thinning-out, always over the entire display panel or in a size close to that of the display panel.

What is claimed is:

1. A display panel comprising:
    a plurality of pixels arranged vertically and horizontally, each pixel comprising 16 dots arranged in first to fourth rows and first to fourth columns, respectively, with the first and fourth rows of dots having a larger width than the second and third rows of dots, respectively, and the first and fourth columns of dots having a larger width than the second and third columns of dots, respectively, such that the pixels can be equally divided into at least two types of pixels including first and second pixels having mutually different areas and formed by different combinations of the 16 dots.

2. A display panel according to claim 1, wherein the pixels can be equally divided into a number m of first pixels having an effective area S1 and can also be equally divided into a number n of second pixels having an effective area S2, satisfying S1<S2 and m/n≠2a, wherein a is a natural number.

3. A display panel according to claim 1, wherein the pixels can be equally divided into a number p of first pixels having an effective area S1, can also be equally divided into a number q of second pixels having an effective area S2, and can further be divided into a number r of third pixels having an effective area S3, satisfying S1<S2<S3 and p/q≠2a, and p/r=2a, wherein a is a natural number.

4. A display panel according to claim 1, wherein
    the plurality of pixels can entirely be divided into a number m of first pixels having mutually equal areas, and
    the plurality of pixels, except for a partial region thereof, can also be divided into a number n of second pixels having mutually equal areas, satisfying m>n and m/n≠a, wherein a is a natural number.

5. A display panel according to claim 1, having a pixel region comprising a plurality of pixels, wherein
    the pixel region can be equally divided into first pixels having an effective area S1 and can also be divided into second pixels having an effective area S2, satisfying:

$$S1 < S2 \text{ and } \sqrt{S2}/\sqrt{S1} \neq b[(b:],$$

wherein b is a natural number.

6. A display panel according to claim 1, having a display picture area comprising a plurality of pixels, wherein
    the entire display picture area can be equally divided into first pixels having an effective area S1 and can also be divided into second pixels having an effective area S2, satisfying:

$$S1 < S2 \text{ and } \sqrt{S2}/\sqrt{S1} \neq b[(b:],$$

wherein b is a natural number.

7. A display panel according to claim 1, having a display picture area comprising a plurality of pixels, wherein
    the entire display picture area can be equally divided into first pixels having an effective area S1 and, except for a partial region thereof, can also be divided into second pixels having an effective area S2, satisfying:

$$S1 < S2 \text{ and } \sqrt{S2}/\sqrt{S1} \neq b[(b:],$$

wherein b is a natural number.

8. A display panel according to any one of claims 2, 3 or 4–7, wherein said second pixel has a dot pattern including said first pixel.

9. A display panel according to any one of claims 2–3 or 4–7, wherein said first pixel has a dot pattern composed of portions of a plurality of adjacent second pixels or of only a portion of a single second pixel.

10. A display panel according to any one of claims 2, 3 or 4–7, wherein each of the first and second pixels comprises a plurality of pixels of mutually different colors.

11. A display panel according to any one of claims 2, 3 or 4–7, wherein each of the first and second pixels comprises a plurality of color pixels of mutually different colors, and each color pixel comprises a plurality of color dots having mutually different areas.

12. A display panel according to any one of claims 2, 3 or 4–7, wherein each of the first and second pixels comprises a yellow pixel, a cyan pixel and a magenta pixel.

13. A display panel according to any one of claims 2, 3 or 4–7, wherein each of the first and second pixels comprises a red pixel, a green pixel and a blue pixel.

14. A display panel according to any one of claims 2, 3 or 4–7, wherein each of the first and second pixels comprises a red pixel, a green pixel and a blue pixel, and the red pixel, the green pixel and the blue pixel comprise at least two types having mutually different areas of red dots, green dots and blue dots, respectively.

15. A display panel according to any one of claims 2, 3 or 4–7, wherein each of the dots has an area defined by a light-intercepting member.

16. A display panel according to any one of claims 2, 3 or 4–7, wherein each of the dots has an area defined by a light-intercepting member and a color filter.

17. A display panel according to any one of claims 2, 3 or 4–7, wherein each dot is formed at an intersection of a scanning line and a data line and caused to have a display state depending on a combination of a voltage applied to the scanning line and a voltage applied to the data line.

18. A display panel according to any one of claims 2, 3 or 4–7, wherein each dot selectively assumes an optical state of either bright or dark.

19. A display panel according to any one of claims 2, 3 or 4–7, wherein said display panel is a liquid crystal display panel using a liquid crystal.

20. A display panel according to any one of claims 2, 3 or 4–7, wherein said display panel is a liquid crystal display panel using a nematic liquid crystal exhibiting two metastable states.

21. A display panel according to any one of claims 2, 3 or 4–7, wherein said display panel is a liquid crystal display panel using a chiral smectic liquid crystal.

22. A display panel according to any one of claims 2, 3 or 4–7, wherein said display panel is a liquid crystal display panel, wherein each dot is provided with a switching device.

23. A display panel according to any one of claims 2, 3 or 4–7, wherein said display panel is a liquid crystal display panel using a super-twisted nematic liquid crystal.

24. A display panel according to any one of claims 2, 3 or 4–7, wherein said display panel is a spontaneous light-emissive display panel.

25. A display panel according to any one of claims 2, 3 or 4–7, wherein said display panel is a reflection-type display panel, wherein a mirror direction is controlled.

26. A display panel according to claim 25, wherein each dot has an area defined by a mirror size.

27. A display panel according to any one of claims 2, 3 or 4–7, wherein each dot has an area defined by a pattern of fluorescent material.

28. A display panel according to any one of claims 2, 3 or 4–7, wherein the first pixel allows a gradational display at a number of levels different from that allowed by the use of the second pixel.

29. A display panel according to any one of claims 2, 3 or 4–7, wherein each second pixel includes three dots having mutually different effective areas corresponding to at least three scanning lines.

30. A display panel according to any one of claims 2, 3 or 4–7, wherein each second pixel includes 6 dots having mutually different effective areas formed at matrix intersections of at least three scanning lines and at least two data lines.

31. A display panel according to any one of claims 2, 3 or 4–7, wherein each second pixel includes three dots having mutually different effective areas corresponding to at least three scanning lines, and larger two dots among the three dots have a total effective area which is almost 4 times that of the remaining smallest dot.

32. A display panel according to any one of claims 2, 3 or 4–7, wherein each second pixel includes two groups of dots corresponding to at least two data lines, and one group of dots have a total effective area which is almost 2 times that of the other group of dots.

33. A display panel according to any one of claims 2, 3 or 4–7, wherein mutually adjacent two dots belonging to one and the other, respectively, of mutually adjacent two second pixels have substantially equal effective areas.

34. A display panel according to any one of claims 2, 3 or 4–7, wherein each second pixel includes three dots having mutually different effective areas corresponding to at least three scanning lines, and mutually adjacent two dots belonging to one and the other, respectively, of mutually adjacent two second pixels have substantially equal effective areas.

35. A display panel according to any one of claims 2, 3 or 4–7, wherein each second pixel includes 6 dots having mutually different effective areas formed at matrix intersections of at least three scanning lines and at least two data lines, and mutually adjacent two dots belonging to one and the other, respectively, of mutually adjacent two second pixels have substantially equal effective areas.

36. A display panel according to any one of claims 2, 3 or 4–7, wherein each second pixel includes three dots having mutually different effective areas corresponding to at least three scanning lines, larger two dots among the three dots have a total effective area which is almost 4 times that of the remaining smallest dot, and mutually adjacent two dots belonging to one and the other, respectively, of mutually adjacent two second pixels have substantially equal effective areas.

37. A display panel according to any one of claims 2, 3 or 4–7, wherein each second pixel includes two groups of dots corresponding to at least two data lines, one group of dots have a total effective area which is almost 2 times that of the other group of dots, and mutually adjacent two dots belonging to one and the other, respectively, of mutually adjacent two second pixels have substantially equal effective areas.

38. A display panel according to any one of claims 2, 3 or 4–7, wherein the first pixels include mutually adjacent first pixels, one of which is divided into two dots or two groups of dots having mutually different effective areas, and the other of which is divided into two dots or two groups of dots having mutually equal effective areas.

39. A display panel according to claim 38, wherein said one first pixel and said the other first pixel are present on different scanning lines.

40. A display panel according to claim 38, wherein a larger dot or group of dots in said one first pixel and one dot or group of dots in said the other first pixel provide a total effective area which is almost 4 times that of a smaller dot or group of dots in said one first pixel.

41. A display apparatus comprising a display panel according to any one of claims 2, 3 or 4–7, and signal processing means for allotting display data to prescribed dots of the display panel depending on a desired resolution.

42. A display panel according to claim 1, wherein the first to fourth rows of dots are arranged in width ratios of 2:1:1:2, and the first to fourth columns of dots are arranged in width ratios of 2:1:1:2.

43. A display panel according to claim 1, wherein the dots in each row are arranged along a scanning line, and the dots in each column are arranged along a data line.

* * * * *

UNITED STATES PATENT AND TRADEMARK OFFICE
CERTIFICATE OF CORRECTION

PATENT NO. : 6,014,121
DATED : January 11, 2000
INVENTOR(S) : Shuntaro Aratani, et al.

It is certified that error appears in the above-identified patent and that said Letters Patent is hereby corrected as shown below:

Sheet 7,
FIG. 7, "ADDREESS" should read -- ADDRESS --.

Sheet 12,
FIG. 11, "Pixel4" should read -- pixel4 --.

Sheet 35,
FIG. 14, "LOW RESOUTION" should read -- LOW RESOLUTION --.

Column 2,
Line 30, "p/q 162a," should read -- $p/q \neq 2a$, --.

Column 4,
Line 4, "First the" should read -- the First --.
Line 40, "Fourth" should read -- the Fourth --.

Column 5,
Line 23, "be" (first occurrence) should be deleted.

Column 6,
Line 4, "car" should read -- can --.
Line 67, "displace" should read -- display --.

Column 8,
Line 56, "bar" should read -- be --.

Column 11,
Line 4, "ps" should be deleted.
Line 55, "tionfrom" should read -- tion from --.

Column 12,
Line 36, "AH/LD" should read -- AH/DL --.

UNITED STATES PATENT AND TRADEMARK OFFICE
CERTIFICATE OF CORRECTION

PATENT NO. : 6,014,121
DATED : January 11, 2000
INVENTOR(S) : Shuntaro Aratani, et al.

It is certified that error appears in the above-identified patent and that said Letters Patent is hereby corrected as shown below:

Column 15,
Line 27, "16levels" should read -- 16 levels --.

Column 16,
Line 40, "20)" should read -- 20 --.

Column 17,
Line 33, "SMODE 1." should read -- SMODE=1 --.

Column 18,
Line 41, "gradational" should read -- gradational display --.

Column 19,
Line 7, "sub-dot" should read -- sub-dots --.
Line 36, "sub-dot" (first occurrence) should read -- sub-dots-- , and "sub-dots." should read -- sub-dot. --.

Column 20,
Line 47, "S1 < S2 and $\sqrt{S2}/\sqrt{S1} \neq b[(b:],$"
should read --S1 < S2 and $\sqrt{S2}/\sqrt{S1} \neq b,$ --.
Line 57, "S1 < S2 and $\sqrt{S2}/\sqrt{S1} \neq b[(b:],$"
should read --S1 < S2 and $\sqrt{S2}/\sqrt{S1} \neq b,$ --.

Column 21,
Line 2, "S1 < S2 and $\sqrt{S2}/\sqrt{S1} \neq b[(b:],$"
should read --S1 < S2 and $\sqrt{S2}/\sqrt{S1} \neq b,$ --.

Lines 6, 8, 12, 15, 20, 23, 26, 32, 35, 38, 43, 46, 49, 53, 56, 59, 62, and 65, "2-3 or" should read -- 2-7, --.
Lines 7, 9, 13, 16, 21, 24, 27, 33, 36, 39, 44, 47, 50, 54, 57, 60, 63, and 66, "4-7," should be deleted.

UNITED STATES PATENT AND TRADEMARK OFFICE
CERTIFICATE OF CORRECTION

PATENT NO. : 6,014,121
DATED : January 11, 2000
INVENTOR(S) : Shuntaro Aratani, et al.

It is certified that error appears in the above-identified patent and that said Letters Patent is hereby corrected as shown below:

Column 22,
Lines 3, 6, 10, 15, 20, 27, 33, 37, 44, 51, and 60, "2-3 or" should read -- 2-7, --.
Lines 4, 7, 11, 16, 21, 28, 34, 38, 45, 52, and 61, "4-7," should be deleted.

Column 23,
Line 1, "2-3 or" should read -- 2-7, --.
Line 2, "4-7," should be deleted.

Column 24,
Line 2, "2-3 or 4-7," should read -- 2-7, --.

Signed and Sealed this

Twenty-third Day of October, 2001

Attest:

*Nicholas P. Godici*

NICHOLAS P. GODICI
*Attesting Officer*   *Acting Director of the United States Patent and Trademark Office*

UNITED STATES PATENT AND TRADEMARK OFFICE
CERTIFICATE OF CORRECTION

PATENT NO. : 6,014,121  
DATED : January 11, 2000  
INVENTOR(S) : Shuntaro Aratani, et al.

Page 1 of 4

It is certified that error appears in the above-identified patent and that said Letters Patent is hereby corrected as shown below:

Sheet 7,  
FIG. 7, "ADDREESS" should read -- ADDRESS --.

Sheet 12,  
FIG. 11, "Pixel4" should read -- pixel4 --.

Sheet 35,  
FIG. 14, "LOW RESOUTION" should read -- LOW RESOLUTION --.

Column 2,  
Line 30, "p/q 162a," should read -- p/q $\neq$ 2a, --.

Column 4,  
Line 4, "First the" should read -- the First --.  
Line 40, "Fourth" should read -- the Fourth --.

Column 5,  
Line 23, "be" (first occurrence) should be deleted.

Column 6,  
Line 4, "car" should read -- can --.  
Line 67, "displace" should read -- display --.

Column 8,  
Line 56, "bar" should read -- be --.

Column 11,  
Line 4, "ps" should be deleted.  
Line 55, "tionfrom" should read -- tion from --.

Column 12,  
Line 36, "AH/LD" should read -- AH/DL --.

Column 15,  
Line 27, "16levels" should read -- 16 levels --.

UNITED STATES PATENT AND TRADEMARK OFFICE
CERTIFICATE OF CORRECTION

PATENT NO. : 6,014,121
DATED : January 11, 2000
INVENTOR(S) : Shuntaro Aratani, et al.

It is certified that error appears in the above-identified patent and that said Letters Patent is hereby corrected as shown below:

Column 16,
Line 40, "20)" should read -- 20 --.

Column 17,
Line 33, "SMODE 1." should read -- SMODE=1 --.

Column 18,
Line 41, "gradational" should read -- gradational display --.

Column 19,
Line 7, "sub-dot" should read -- sub-dots --.
Line 36, "sub-dot" (first occurrence) should read -- sub-dots --, and "sub-dots." should read -- sub-dot. --.

Column 20,
Line 47, "S1 < S2 and $\sqrt{S2}/\sqrt{S1} \neq b[(b:],$" should read -- S1 < S2 and $\sqrt{S2}/\sqrt{S1} \neq b,$ --.

Line 57, "S1 < S2 and $\sqrt{S2}/\sqrt{S1} \neq b[(b:],$" should read

-- S1 < S2 and $\sqrt{S2}/\sqrt{S1} \neq b,$ --.

Column 21,
Line 2, "S1 < S2 and $\sqrt{S2}/\sqrt{S1} \neq b[(b:],$" should read

-- S1 < S2 and $\sqrt{S2}/\sqrt{S1} \neq b,$ --.

Line 6, "2-3 or" should read -- 2-7, --.
Line 7, "4-7," should be deleted.
Line 8, "2-3 or" should read -- 2-7, --.
Line 9, "4-7," should be deleted.
Line 12, "2-3 or" should read -- 2-7, --.
Line 13, "4-7," should be deleted.
Line 15, "2-3 or" should read -- 2-7, --.
Line 16, "4-7," should be deleted.
Line 20, "2-3 or" should read -- 2-7, --.

UNITED STATES PATENT AND TRADEMARK OFFICE
CERTIFICATE OF CORRECTION

PATENT NO.    : 6,014,121
DATED         : January 11, 2000
INVENTOR(S)   : Shuntaro Aratani, et al.

It is certified that error appears in the above-identified patent and that said Letters Patent is hereby corrected as shown below:

Column 21, continued,
Line 21, "4-7," should be deleted.
Line 23, "2-3 or" should read -- 2-7, --.
Line 24, "4-7," should be deleted.
Line 26, "2-3 or" should read -- 2-7, --.
Line 27, "4-7," should be deleted.
Line 32, "2-3 or" should read -- 2-7, --.
Line 33, "4-7," should be deleted.
Line 35, "2-3 or" should read -- 2-7, --.
Line 36, "4-7," should be deleted.
Line 38, "2-3 or" should read -- 2-7, --.
Line 39, "4-7," should be deleted.
Line 43, "2-3 or" should read -- 2-7, --.
Line 44, "4-7," should be deleted.
Line 46, "2-3 or" should read -- 2-7, --.
Line 47, "4-7," should be deleted.
Line 49, "2-3 or" should read -- 2-7, --.
Line 50, "4-7," should be deleted.
Line 53, "2-3 or" should read -- 2-7, --.
Line 54, "4-7," should be deleted.
Line 56, "2-3 or" should read -- 2-7, --.
Line 57, "4-7," should be deleted.
Line 59, "2-3 or" should read -- 2-7, --.
Line 60, "4-7," should be deleted.
Line 62, "2-3 or" should read -- 2-7, --.
Line 63, "4-7," should be deleted.
Line 65, "2-3 or" should read -- 2-7, --.
Line 66, "4-7," should be deleted.

Column 22, continued,
Line 3, "2-3 or" should read -- 2-7, --.
Line 4, "4-7," should be deleted.
Line 6, "2-3 or" should read -- 2-7, --.
Line 7, "4-7," should be deleted.
Line 10, "2-3 or" should read -- 2-7, --.
Line 11, "4-7," should be deleted.
Line 15, "2-3 or" should read -- 2-7, --.

UNITED STATES PATENT AND TRADEMARK OFFICE
CERTIFICATE OF CORRECTION

PATENT NO.    : 6,014,121
DATED         : January 11, 2000
INVENTOR(S)   : Shuntaro Aratani, et al.

It is certified that error appears in the above-identified patent and that said Letters Patent is hereby corrected as shown below:

Column 22, continued,
Line 16, "4-7," should be deleted.
Line 20, "2-3 or" should read -- 2-7, --.
Line 21, "4-7," should be deleted.
Line 27, "2-3 or" should read -- 2-7, --.
Line 28, "4-7," should be deleted.
Line 33, "2-3 or" should read -- 2-7, --.
Line 34, "4-7," should be deleted.
Line 37, "2-3 or" should read -- 2-7, --.
Line 38, "4-7," should be deleted.
Line 44, "2-3 or" should read -- 2-7, --.
Line 45, "4-7," should be deleted.
Line 51, "2-3 or" should read -- 2-7, --.
Line 52, "4-7," should be deleted.
Line 60, "2-4 or" should read -- 2-7, --.
Line 61, "4-7," should be deleted.

Column 23,
Line 1, "2-3 or" should read -- 2-7, --.
Line 2, "4-7," should be deleted.

Column 24,
Line 2, "2-3 or 4-7," should read -- 2-7, --.

Signed and Sealed this

Eleventh Day of December, 2001

*Attest:*

*Attesting Officer*

NICHOLAS P. GODICI
*Acting Director of the United States Patent and Trademark Office*